US010019059B2

(12) United States Patent
Messingher et al.

(10) Patent No.: US 10,019,059 B2
(45) Date of Patent: Jul. 10, 2018

(54) GLOVE INTERFACE OBJECT

(71) Applicant: Sony Interactive Entertainment Inc., Tokyo (JP)

(72) Inventors: Shai Messingher, San Mateo, CA (US); Richard Stenson, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 195 days.

(21) Appl. No.: 14/517,741

(22) Filed: Oct. 17, 2014

(65) Prior Publication Data

US 2016/0054798 A1 Feb. 25, 2016

Related U.S. Application Data

(60) Provisional application No. 62/041,023, filed on Aug. 22, 2014, provisional application No. 62/058,029, filed on Sep. 30, 2014.

(51) Int. Cl.
*G06F 3/01* (2006.01)
*G02B 27/01* (2006.01)
(Continued)

(52) U.S. Cl.
CPC ............ *G06F 3/014* (2013.01); *A63F 13/212* (2014.09); *G02B 27/0093* (2013.01);
(Continued)

(58) Field of Classification Search
None
See application file for complete search history.

(56) References Cited

U.S. PATENT DOCUMENTS

| 4,988,981 A | 1/1991 | Zimmerman et al. |
| 6,141,643 A * | 10/2000 | Harmon .................. G10L 21/06 235/462.44 |

(Continued)

FOREIGN PATENT DOCUMENTS

| EP | 1944678 | 7/2008 |
| WO | 0107995 | 2/2001 |
| WO | 2004114107 | 12/2004 |

OTHER PUBLICATIONS

Notification of Transmittal of the International Search Report and the Written Opinion of the International Searching Authority issued in International Application No. PCT/US2015/046414, dated Nov. 16, 2015 (14 total pages).

*Primary Examiner* — Nicholas Lee
(74) *Attorney, Agent, or Firm* — Martine Penilla Group, LLP

(57) ABSTRACT

A glove interface object is provided, comprising: at least one flex sensor configured to generate flex sensor data identifying a flex of at least one finger portion of the glove interface object; at least one contact sensor configured to generate contact sensor data identifying a contact between a first portion of the glove interface object and a second portion of the glove interface object; a communications module configured to transmit the flex sensor data and the contact sensor data to a computing device for processing to determine a finger position pose of the glove interface object, the finger position pose being applied for rendering a virtual hand in a view of a virtual environment on a head-mounted display (HMD), the virtual hand being rendered based on the identified finger position pose.

28 Claims, 27 Drawing Sheets

(51) Int. Cl.
    *G06T 19/00*         (2011.01)
    *G06F 3/041*         (2006.01)
    *A63F 13/212*       (2014.01)
    *G02B 27/00*         (2006.01)
    *G06F 3/0346*       (2013.01)

(52) U.S. Cl.
    CPC ....... *G02B 27/017* (2013.01); *G02B 27/0172* (2013.01); *G06F 3/012* (2013.01); *G06F 3/016* (2013.01); *G06F 3/017* (2013.01); *G06F 3/0346* (2013.01); *G06F 3/041* (2013.01); *G06T 19/006* (2013.01); *G02B 2027/014* (2013.01); *G02B 2027/0178* (2013.01); *G06F 2203/013* (2013.01); *G06F 2203/04102* (2013.01)

(56) References Cited

U.S. PATENT DOCUMENTS

| | | | |
|---|---|---|---|
| 2009/0177452 A1 | 7/2009 | Ullrich et al. | |
| 2012/0302347 A1* | 11/2012 | Nicholson | A63F 13/06 463/37 |
| 2013/0082922 A1 | 4/2013 | Miller | |
| 2013/0265300 A1* | 10/2013 | Vardi | G06F 1/163 345/419 |
| 2015/0331522 A1* | 11/2015 | McMillen | G06F 1/163 345/174 |

* cited by examiner

GLOVE INTERFACE OBJECT

CLAIM OF PRIORITY

This application claims priority to U.S. Provisional Patent Application No. 62/041,023, filed Aug. 22, 2014, entitled "Glove Interface Object," and to U.S. Provisional Patent Application No. 62/058,029, filed Sep. 30, 2014, entitled "Thumb Controller," the disclosures of which are incorporated by reference herein.

BACKGROUND

1. Field of the Invention

The present invention relates to a glove interface object and associated methods and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide for a glove interface object and associated methods and systems.

In accordance with embodiments of the invention, a glove interface object is provided for enabling a user to interact with an interactive application, such as a video game. The glove interface object can incorporate various types of devices to facilitate various types of functionality. In some implementations, the glove interface object includes flex sensors which are capable of detecting the amount of flexing of the user's fingers. In some implementations, the glove interface object includes pressure sensors, mounted to various locations such as the fingertips and/or the palm, which are capable of detecting when pressure is applied to such areas, and the magnitude of such pressure. In some implementations, the glove interface object includes touch switches, which are configured to detect contact between one portion of the user's hand and another portion of the same hand or the user's other hand. For example, touch switches may detect when a user's thumb touches any of the other fingers on the same hand, and/or when any of those other fingers touches the palm of the user's hand. In some implementations, the glove interface object includes an index-thumb touchpad, that is configured to detect contact between the user's thumb and the side of the index finger, and define variable input based on the location along the side of the index finger that is being contacted by the thumb.

As used herein, a glove interface object may be utilized as a glove controller for a video game. However, it should be understood that the glove interface object does not necessarily have to be a controller utilized for playing games, but may be used for interfacing with virtual objects on a display screen viewable by a user, and for any other suitable purpose for which input defined from the glove interface object may be applied. It should be appreciated that the present invention can be implemented in numerous ways, such as a process, an apparatus, a system, a device or a method on a computer readable medium. Several inventive embodiments of the present invention are described below.

In one embodiment, a glove interface object is provided, comprising: at least one flex sensor configured to generate flex sensor data identifying a flex of at least one finger portion of the glove interface object; at least one contact sensor configured to generate contact sensor data identifying a contact between a first portion of the glove interface object and a second portion of the glove interface object; a communications module configured to transmit the flex sensor data and the contact sensor data to a computing device for processing to determine a finger position pose of the glove interface object, the finger position pose being applied for rendering a virtual hand in a view of a virtual environment on a head-mounted display (HMD), the virtual hand being rendered based on the identified finger position pose.

In one embodiment, the contact sensor data includes data identifying contact between a thumb portion of the glove interface object and at least one other finger portion of the glove interface object.

In one embodiment, the contact sensor data includes data identifying contact between at least one finger portion of the glove interface object and a palm portion of the glove interface object.

In one embodiment, the view of the virtual environment is defined from a perspective of a virtual character in the virtual environment that is associated to the head-mounted display; wherein the virtual hand is a hand of the virtual character.

In one embodiment, the glove interface object further includes: a trackable object that is configured to be illuminated during interactivity, the trackable object configured to be identified from captured image data by the computing device to enable tracking of a location of the glove interface object in the interactive environment; wherein the virtual hand is rendered at a location in the virtual environment that is substantially defined by the location of the glove interface object in the interactive environment.

In one embodiment, the glove interface object further includes: at least one inertial sensor for generating inertial sensor data; wherein the communications module is configured to transmit the inertial sensor data to the computing device for processing to identify and track a location of the glove interface object in the interactive environment; wherein the virtual hand is rendered at a location in the virtual environment that is substantially defined by the location of the glove interface object in the interactive environment.

In one embodiment, the communications module is configured to receive haptic feedback data from the computing device; the glove interface object further comprising a haptic feedback mechanism that is configured to generate haptic feedback based on the haptic feedback data.

In one embodiment, the glove interface object further includes: at least one pressure sensor configured to generate pressure sensor data identifying a pressure applied to at least a portion of the glove interface object; wherein the communications module is configured to send the pressure sensor data to the computing device for processing to determine the finger position pose.

In one embodiment, the pressure sensor data quantifies an amount of force applied to the at least a portion of the glove interface object; and wherein the quantified amount of force defines a level of an action that is defined for the virtual environment.

In one embodiment, the HMD includes, a viewing module including an inner side having a view port into a screen configured for rendering image content that defines the view of the virtual environment; an HMD communications module for exchanging data with the computing device; an image processing module for processing image data received from the computing device for rendering the image content on the screen; a plurality of illuminating elements integrated with an exterior housing of the viewing module, the plurality of illumination elements defined for image tracking of the HMD by a camera; illumination logic for controlling the plurality of illumination elements to be active or inactive; and at least one inertial sensor defined for inertial tracking of the HMD.

In another embodiment, a method is provided, comprising: rendering a view of a virtual environment to a head-mounted display (HMD); receiving flex sensor data from a glove interface object, the flex sensor data identifying a flex of at least one finger portion of the glove interface object; receiving contact sensor data from the glove interface object, the contact sensor data identifying a contact between a first portion of the glove interface object and a second portion of the glove interface object; processing the flex sensor data and the contact sensor data to determine a finger position pose of the glove interface object; rendering in the view of the virtual environment a virtual hand, the virtual hand being rendered based on the identified finger position pose.

In one embodiment, the contact sensor data includes data identifying contact between a thumb portion of the glove interface object and at least one other finger portion of the glove interface object.

In one embodiment, the contact sensor data includes data identifying contact between at least one finger portion of the glove interface object and a palm portion of the glove interface object.

In one embodiment, the view of the virtual environment is defined from a perspective of a virtual character in the virtual environment that is associated to the head-mounted display; wherein the virtual hand is a hand of the virtual character.

In one embodiment, the method further includes: receiving captured image data of an interactive environment; processing the captured image data to identify and track a location of the glove interface object in the interactive environment; wherein rendering the virtual hand is at a location in the virtual environment that is substantially defined by the location of the glove interface object in the interactive environment.

In one embodiment, the method further includes: receiving inertial sensor data from the glove interface object; processing the inertial sensor data to identify and track a location of the glove interface object in the interactive environment; wherein rendering the virtual hand is at a location in the virtual environment that is substantially defined by the location and orientation of the glove interface object in the interactive environment.

In one embodiment, the method further includes: detecting contact between the virtual hand and a virtual object in the virtual environment; generating haptic feedback data based on the detected contact between the virtual hand and the virtual object; sending the haptic feedback data to the glove interface object.

In one embodiment, the method further includes: receiving pressure sensor data identifying a pressure applied to at least a portion of the glove interface object; wherein determining the finger position pose includes processing the pressure sensor data.

In one embodiment, the pressure sensor data quantifies an amount of force applied to the at least a portion of the glove interface object; and wherein the quantified amount of force defines a level of an action that is defined for the virtual environment.

In one embodiment, rendering the view of the virtual environment to the HMD includes generating image data and sending the image data to the HMD, the HMD having an image processing module for processing the image data to render image content on the screen of a viewing module of the HMD, the viewing module including an inner side having a view port into the screen that is configured for rendering the image content that defines the view of the virtual environment; receiving captured image data of a plurality of illuminating elements integrated with an exterior housing of the viewing module of the HMD, and processing the captured image data to track the HMD.

In another embodiment, a method is provided, comprising: rendering a view of a virtual environment to a head-mounted display; receiving flex sensor data from a glove interface object, the flex sensor data identifying a flex of at least one finger portion of the glove interface object; receiving pressure sensor data identifying a pressure applied to at least a portion of the glove interface object; processing the flex sensor data and the pressure sensor data to determine a finger position pose of the glove interface object; rendering in the view of the virtual environment a virtual hand, the virtual hand being rendered based on the identified finger position pose.

In one embodiment, the pressure sensor data quantifies an amount of force applied to the at least a portion of the glove interface object.

In one embodiment, the quantified amount of force defines a level of an action that is defined for the virtual environment.

In one embodiment, the view of the virtual environment is defined from a perspective of a virtual character in the virtual environment that is associated to the head-mounted display; wherein the virtual hand is a hand of the virtual character.

In one embodiment, the method further includes: receiving captured image data of an interactive environment; processing the captured image data to identify and track a location of the glove interface object in the interactive environment; wherein rendering the virtual hand is at a location in the virtual environment that is substantially defined by the location of the glove interface object in the interactive environment.

In one embodiment, the method further includes: receiving inertial sensor data from the glove interface object; processing the inertial sensor data to identify and track a location of the glove interface object in the interactive environment; wherein rendering the virtual hand is at a location in the virtual environment that is substantially defined by the location and orientation of the glove interface object in the interactive environment.

In one embodiment, the method further includes: detecting contact between the virtual hand and a virtual object in the virtual environment; generating haptic feedback data based on the detected contact between the virtual hand and the virtual object; sending the haptic feedback data to the glove interface object.

In one embodiment, the method further includes: rendering, in the view of the virtual environment, visual feedback that is responsive to the detected contact between the virtual hand and the virtual object.

In one embodiment, rendering the view of the virtual environment to the HMD includes generating image data and sending the image data to the HMD, the HMD having an image processing module for processing the image data to render image content on the screen of a viewing module of the HMD, the viewing module including an inner side having a view port into the screen that is configured for rendering the image content that defines the view of the virtual environment; receiving captured image data of a plurality of illuminating elements integrated with an exterior housing of the viewing module of the HMD, and processing the captured image data to track the HMD.

In one embodiment, tracking the HMD is defined by tracking of one or more of an orientation or a location of the HMD.

In another embodiment, a method is provided, comprising: rendering a view of a virtual environment to a head-mounted display (HMD), the view of the virtual environment including a virtual hand of a virtual character, the view of the virtual environment being defined from a perspective of the virtual character in the virtual environment; receiving sensor data from a glove interface object, the sensor data identifying at least one physical state of at least a portion of the glove interface object; processing the sensor data to identify a pose of the glove interface object; in response to identifying the pose, rendering in the view, at substantially a location of the virtual hand in the virtual environment, a virtual object that is correlated to the identified pose of the glove interface object.

In one embodiment, the method further includes: tracking a location and orientation of the glove interface object in an interactive environment; wherein a location and orientation of the virtual object in the virtual environment is defined from the location and orientation of the glove interface object.

In one embodiment, tracking the location and orientation of the glove interface object includes processing captured image data of the interactive environment to identify one or more illuminating objects of the glove interface object.

In one embodiment, tracking the location and orientation of the glove interface object includes processing inertial sensor data from the glove interface object.

In one embodiment, processing the sensor data further includes detecting a change from the identified pose of the glove interface object; in response to detecting the change, triggering an action associated with the object.

In one embodiment, the object is a weapon; wherein triggering the action is defined by firing the weapon.

In one embodiment, rendering the virtual object includes rendering the virtual object being held by the virtual hand in the virtual environment.

In one embodiment, the method further includes: generating, in response to identifying the pose, haptic feedback data; sending the haptic feedback data to the glove interface object to produce a haptic feedback event that is responsive to the identified pose.

In one embodiment, receiving sensor data from the glove interface object is defined by one or more of, receiving flex sensor data identifying a flex of at least one finger portion of the glove interface object, receiving contact sensor data identifying a contact between a first portion of the glove interface object and a second portion of the glove interface object, or, receiving pressure sensor data identifying a pressure applied to at least a portion of the glove interface object.

In one embodiment, rendering the view of the virtual environment to the HMD includes generating image data and sending the image data to the HMD, the HMD having an image processing module for processing the image data to render image content on the screen of a viewing module of the HMD, the viewing module including an inner side having a view port into the screen that is configured for rendering the image content that defines the view of the virtual environment; receiving captured image data of a plurality of illuminating elements integrated with an exterior housing of the viewing module of the HMD, and processing the captured image data to track the HMD.

In another embodiment, a method is provided, comprising: rendering a view of a virtual environment to a head-mounted display; receiving flex sensor data from a glove interface object, the flex sensor data identifying a flex of at least one finger portion of the glove interface object; receiving contact sensor data from the glove interface object, the contact sensor data identifying a contact between a first portion of the glove interface object and a second portion of the glove interface object; receiving pressure sensor data from the glove interface object, the pressure sensor data identifying a pressure applied to at least a portion of the glove interface object; processing the flex sensor data, the contact sensor data, and the pressure sensor data to determine a finger position pose of the glove interface object;

rendering in the view of the virtual environment a virtual hand, the virtual hand being rendered based on the identified finger position pose.

In one embodiment, the contact sensor data includes data identifying contact between a thumb portion of the glove interface object and at least one other finger portion of the glove interface object.

In one embodiment, the contact sensor data includes data identifying contact between at least one finger portion of the glove interface object and a palm portion of the glove interface object.

In one embodiment, the view of the virtual environment is defined from a perspective of a virtual character in the virtual environment that is associated to the head-mounted display; wherein the virtual hand is a hand of the virtual character.

In one embodiment, the method further includes: receiving captured image data of an interactive environment; processing the captured image data to identify and track a location of the glove interface object in the interactive environment; wherein rendering the virtual hand is at a location in the virtual environment that is substantially defined by the location of the glove interface object in the interactive environment.

In one embodiment, the method further includes: receiving inertial sensor data from the glove interface object; processing the inertial sensor data to identify and track a location of the glove interface object in the interactive environment; wherein rendering the virtual hand is at a location in the virtual environment that is substantially defined by the location and orientation of the glove interface object in the interactive environment.

In one embodiment, the method further includes: detecting contact between the virtual hand and a virtual object in the virtual environment; generating haptic feedback data based on the detected contact between the virtual hand and the object; sending the haptic feedback data to the glove interface object.

In another embodiment, a method for interfacing with an interactive application by a glove interface object is provided, comprising: generating flex data, the flex data identifying a flex of at least one finger portion of the glove interface object; generating contact data, the contact data identifying a contact between a first portion of the glove interface object and a second portion of the glove interface object; sending the flex data and the contact data to a computing device for processing to determine a finger position pose of the glove interface object, the finger position pose being applied to render a virtual hand in a view of a virtual environment on a head-mounted display.

In another embodiment, a glove interface object for providing interactive input to an interactive application is provided, comprising: at least one flex sensor defined along at least one finger portion of the glove interface object; at least one contact switch configured to detect contact between a thumb portion of the glove interface object and any other finger portion of the glove interface object; a communications module configured to transmit sensor data from the at least one flex sensor and/or the at least one contact switch to a computing device, for processing to determine a configuration of a virtual hand in a virtual environment that is viewable from a head-mounted display.

In one embodiment, the glove interface object further includes: a trackable object that is configured to be illuminated during interactivity with the interactive application, the trackable object configured to be tracked based on analysis of captured images of an interactive environment in which the glove interface object is disposed during the interactivity with the interactive application, to enable determination of a location and/or orientation of the glove interface object in the interactive environment; wherein the configuration of the virtual hand in the virtual environment is defined at least in part based on the determined location and/or orientation of the glove interface object in the interactive environment.

In one embodiment, the glove interface object further includes: at least one inertial sensor; wherein the communications module is configured to transmit inertial sensor data from the at least one inertial sensor to the computing device, for processing to determine a location and/or orientation of the glove interface object; wherein the configuration of the virtual hand in the virtual environment is defined at least in part based on the determined location and/or orientation of the glove interface object in the interactive environment.

In one embodiment, the glove interface object further includes: an outer glove configured to include the flex sensor, contact switch, and communications module; a removable inner glove configured to be worn on a hand of a user and disposed within the outer glove during interactivity with the interactive application.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
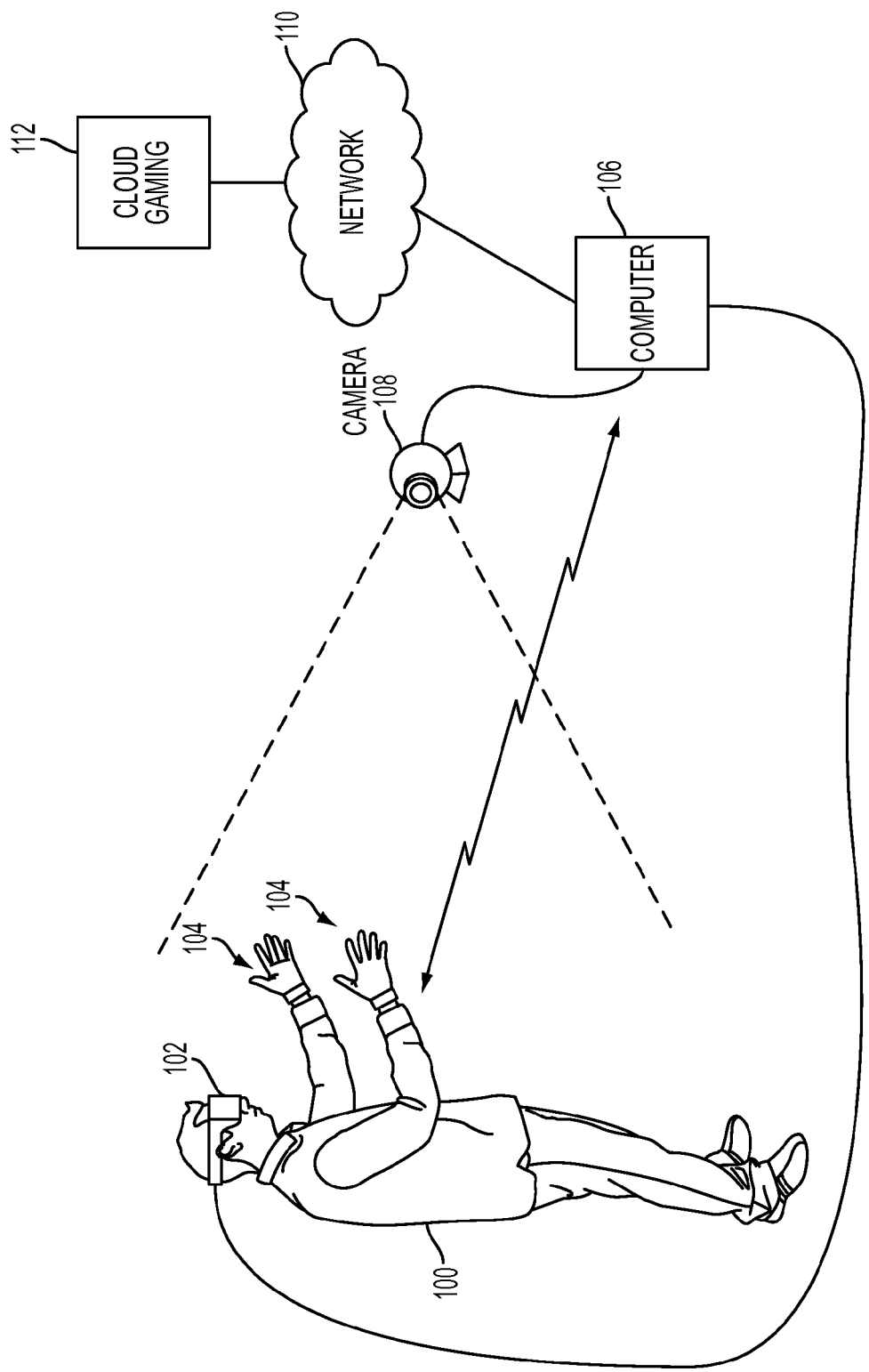
FIG. 1A illustrates a system for interactive gameplay of a video game, in accordance with an embodiment of the invention.

The following embodiments provide a glove interface object and associated systems, methods, and apparatuses.

In one embodiment, the methods, systems, image capture objects, sensors and associated interfaces objects (e.g., gloves) are configured to process data that is configured to be rendered in substantial real time on a display screen. For example, when a user's hand changes positions (e.g., the hand moves, fingers bend, multiple fingers bend, fingers touch other fingers and/or gestures are made), the changes in positions are configured to be displayed in substantial real time on a display.

The display may be the display of a head mounted display (HMD), a display of a second screen, a display of a portable device, a computer display, a display panel, a display of a remotely connected users (e.g., whom may be viewing content or sharing in an interactive experience), or the like. In some embodiments, the captured positions of the user's hand, the pressures sensed, the fingers touched, and/or the hand/finger gestures are used to interact in a video game, in a virtual world scene, a shared virtual space, a video game character, a character that is an extension of the real-world user, or simply provide a way of touching, holding, playing, interfacing or contacting virtual objects shown on a display screen or objects associated with documents, text, images, and the like.

In still other embodiments, virtual gloves may be worn by multiple users in a multi-user game. In such examples, each user may use one or two gloves. The users may be co-located or interfacing in a shared space or shared game from remote locations using a cloud gaming system, networked device and/or social networked collaboration space. In some embodiments, a glove may be used by one or more remote users to interact in a collaborative way to examine documents, screens, applications, diagrams, business information, or the like. In such an implementation, users collaborating may use their gloves to touch objects, move objects, interface with surfaces, press on objects, squeeze objects, toss objects, make gesture actions or motions, or the like.

During collaboration, movements made by one user's hand can appear to the other user as if a real user hand is moving things, objects, or making actions in the collaboration space. Still in a collaboration environment, if two remote users are examining documents, users wearing gloves can point at things on a virtual page, point and draw on a virtual whiteboard, lift and move virtual papers, shake hands, move items, etc. In some collaborative environments, one or more of the users may be wearing an HMD. When the HMD is used in conjunction with the glove or gloves (e.g., worn by one or more users), the users may see a virtual environment in which they can collaborate using their hands, such as moving objects, pages, objects, typing on virtual keyboards, moving virtual pages, tapping on things, pressing on things, etc.

Therefore, it should be understood that the uses of a glove that includes one or more sensors, and/or can detect pressure, and/or can detect bending position of fingers, and/or can detect orientation, and/or can detect inertial movement, etc., can provide for a broad scope of uses. Example uses, without limitation, may include video gaming, entertainment activities, sport related activities, travel and exploring related activities, human-to-human contact (e.g., shaking hands of a remote user), business activities, etc. In one implementation, this type of interactivity provided by a glove interface may be extended to additional sensors that may be attached or associated with other parts of the human body (e.g., an arm, a leg, a foot, etc.). In addition to gloves, different types of clothes are envisioned, e.g., jackets, pants, shoes, hats, etc.

It will be obvious, however, to one skilled in the art, that the present invention may be practiced without some or all of these specific details. In other instances, well known process operations have not been described in detail in order not to unnecessarily obscure the present invention.

FIG. 1A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture image of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, as described in further detail below, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, glove interface object 104, and camera 108 may be wired or wireless.

Figure 1B:
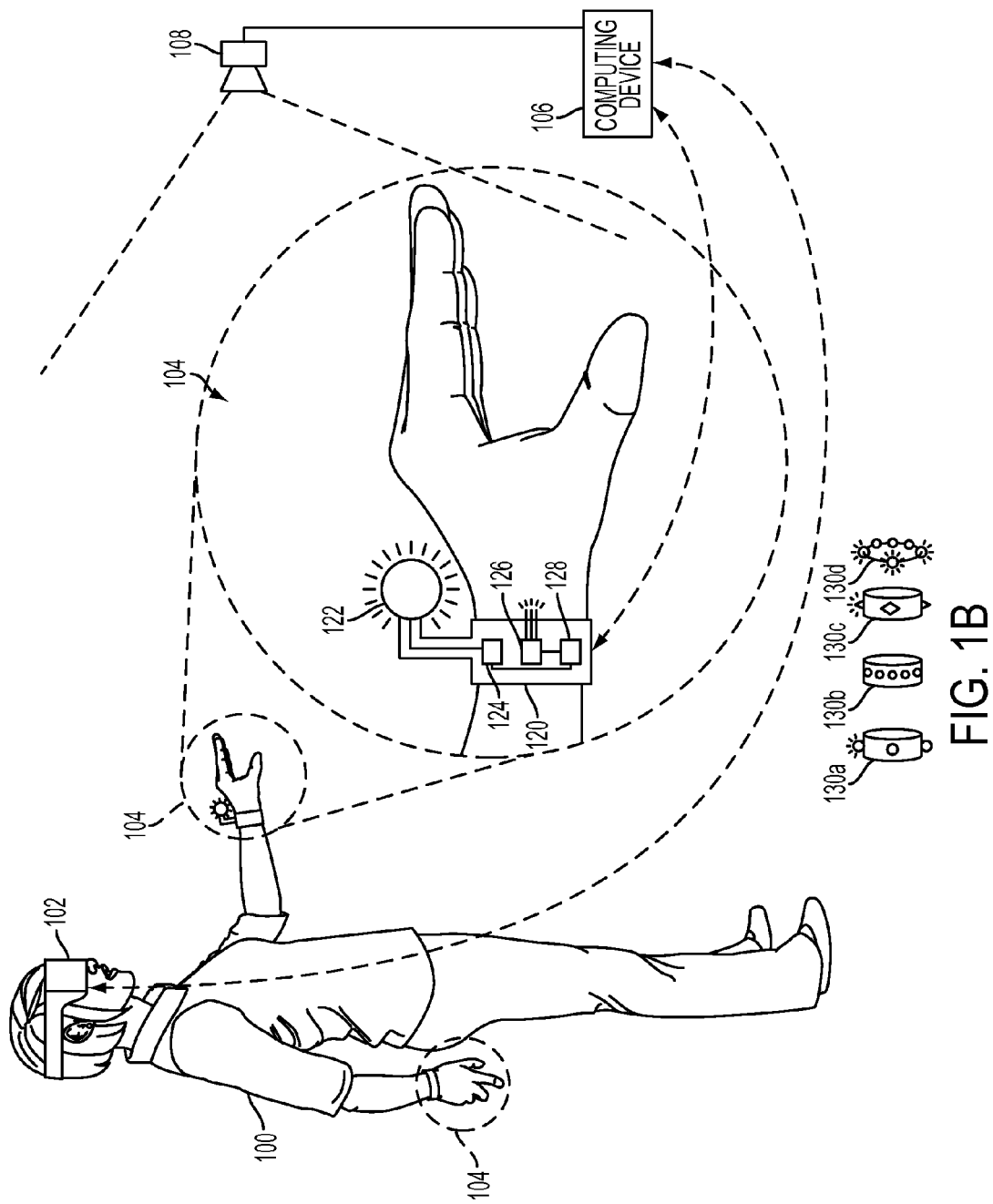
FIG. 1B illustrates a system for interactive gameplay of a videogame, in accordance with an embodiment of the invention.

FIG. 1B illustrates a system for interactive gameplay of a videogame, in accordance with an embodiment of the invention. A close-up view of a glove interface object 104 is shown. In some implementations, the glove interface object 104 can include a bracelet 120, having various devices and components defined therein. For example, the bracelet 120 can include a light or illuminated object 122, which can be tracked to identify the location and or orientation of the glove interface object in the interactive environment based on analysis of captured images of the interactive environment including the glove interface object 104. In one embodiment, the bracelet 120 includes a light controller 124 that is configured to control the operation of the light 122. By way of example, the color, intensity, on/off state, and other attributes of the light 122 can be controlled.

The bracelet 120 can include various electronics for communicating with other devices of the glove interface object 104, such as various sensors as are described in the present disclosure. In one embodiment, the bracelet 120 includes a sensor data processor 126 for processing data received from various sensors of the glove interface object, such as flex sensors, pressure sensors, contact switches, index thumb touchpad, biometric sensors, etc. Furthermore, the bracelet 120 may include a communications module 128 that is configured to transmit and/or receive data from other devices, such as the computing device 106 and/or the headmounted display 102.

In various implementations, the bracelet 120 can include one or more lights or illuminated objects arranged in various configurations on the bracelet. Some possible examples illustrating the arrangement of lights on a bracelet are shown at reference 130a, 130b, 130c, and 130d.

Figure 2:
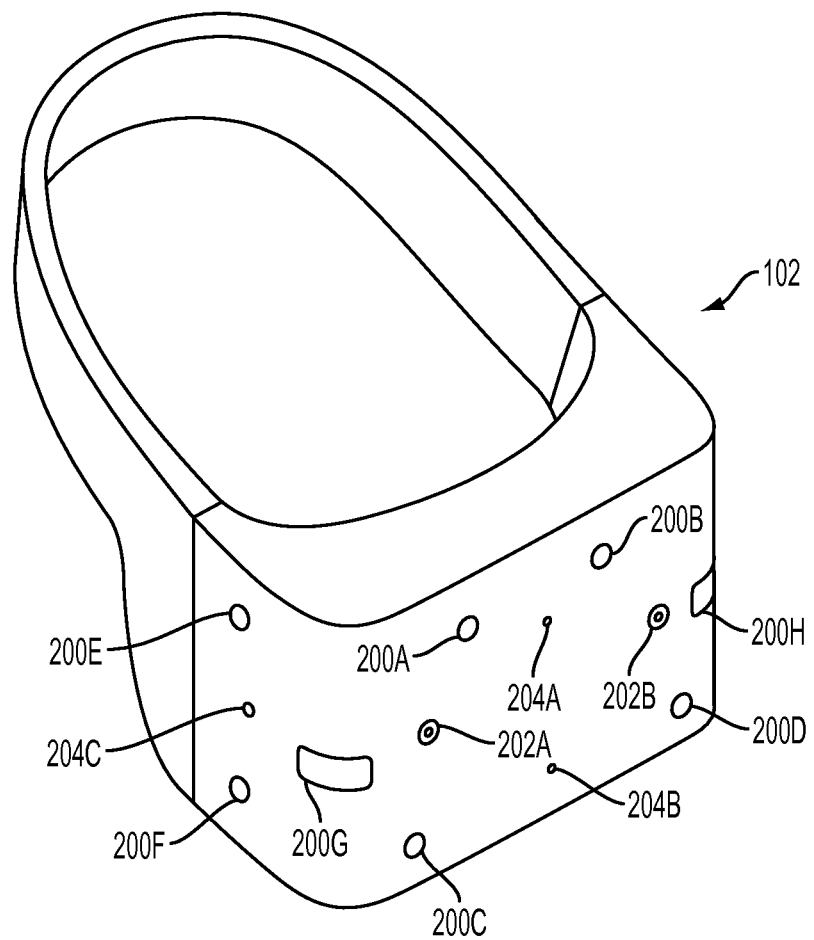
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
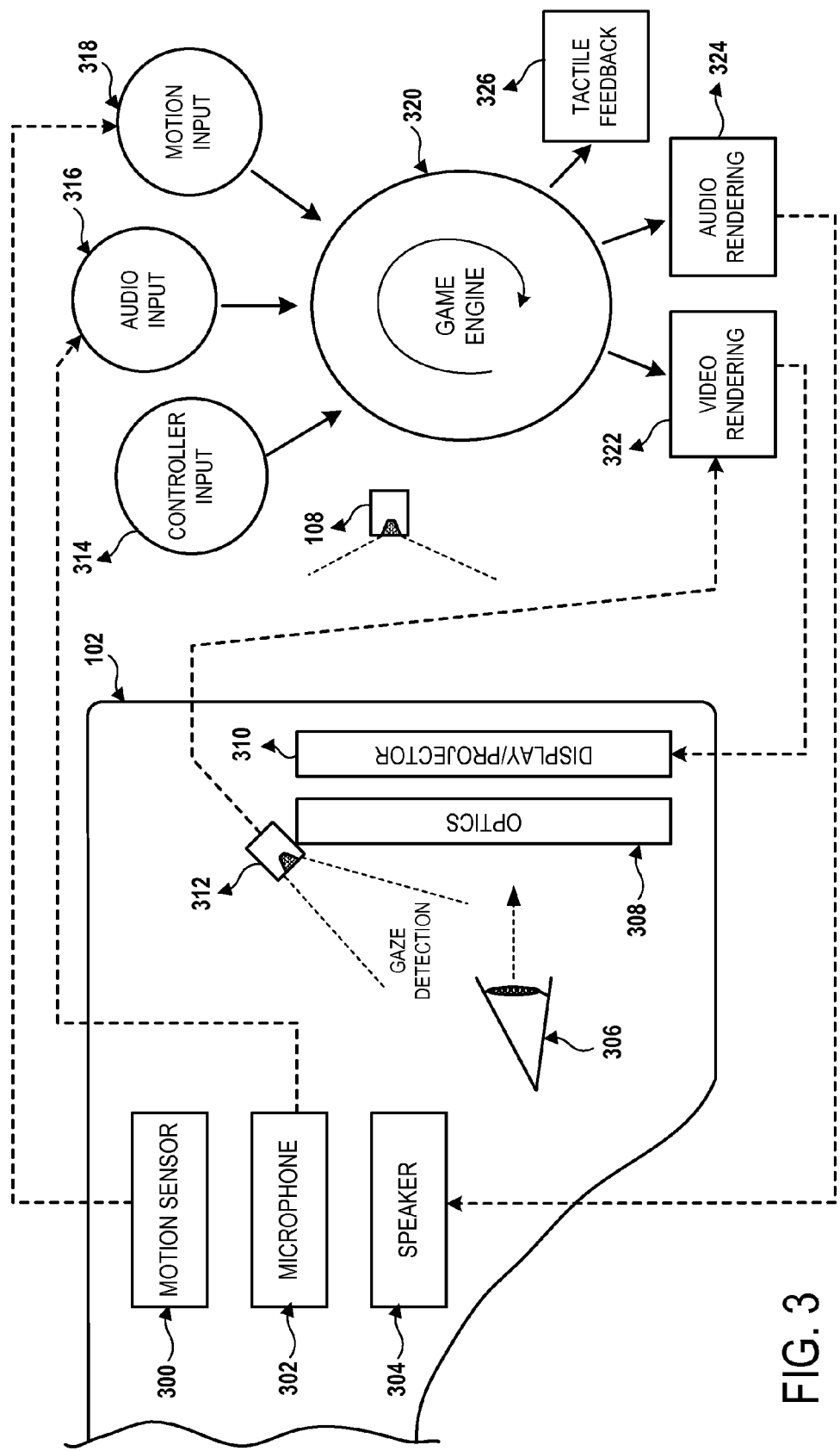
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108. The motion input 218 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. In light of this immersive aspect of the HMD experience, it is desirable to provide intuitive control mechanisms to the user, especially as the user may not be able to see their own hands or objects (e.g. controller) they are holding. Thus, in accordance with embodiments of the invention described herein, methods, apparatus, and systems are provided for a glove interface object.

Throughout the present disclosure, reference is made to the glove interface object and the user's hand, including the fingers, palm, and other portions thereof. For purposes of ease of description and readability of the present disclosure, it will be understood by those skilled in the art that the glove interface object and the user's hand (and/or portion thereof) may in many instances be referenced interchangeably and/or in the alternative. That is, an activity (e.g. pose, position, movement, orientation, location, action, etc.) defined by a user's hand, also pertains to the glove interface object that is being worn on the user's hand, as the glove interface object is configured to detect or facilitate detection of the activity of the user's hand. Therefore, it may be convenient for descriptive purposes to discuss certain aspects in the present disclosure utilizing language pertaining to the user's hand. However, it will be readily appreciated that the glove interface object is worn on the user's hand and that such may apply or in fact be defined by the glove interface object, this being apparent to those skilled in the art from the context of the description.

Figure 4A:
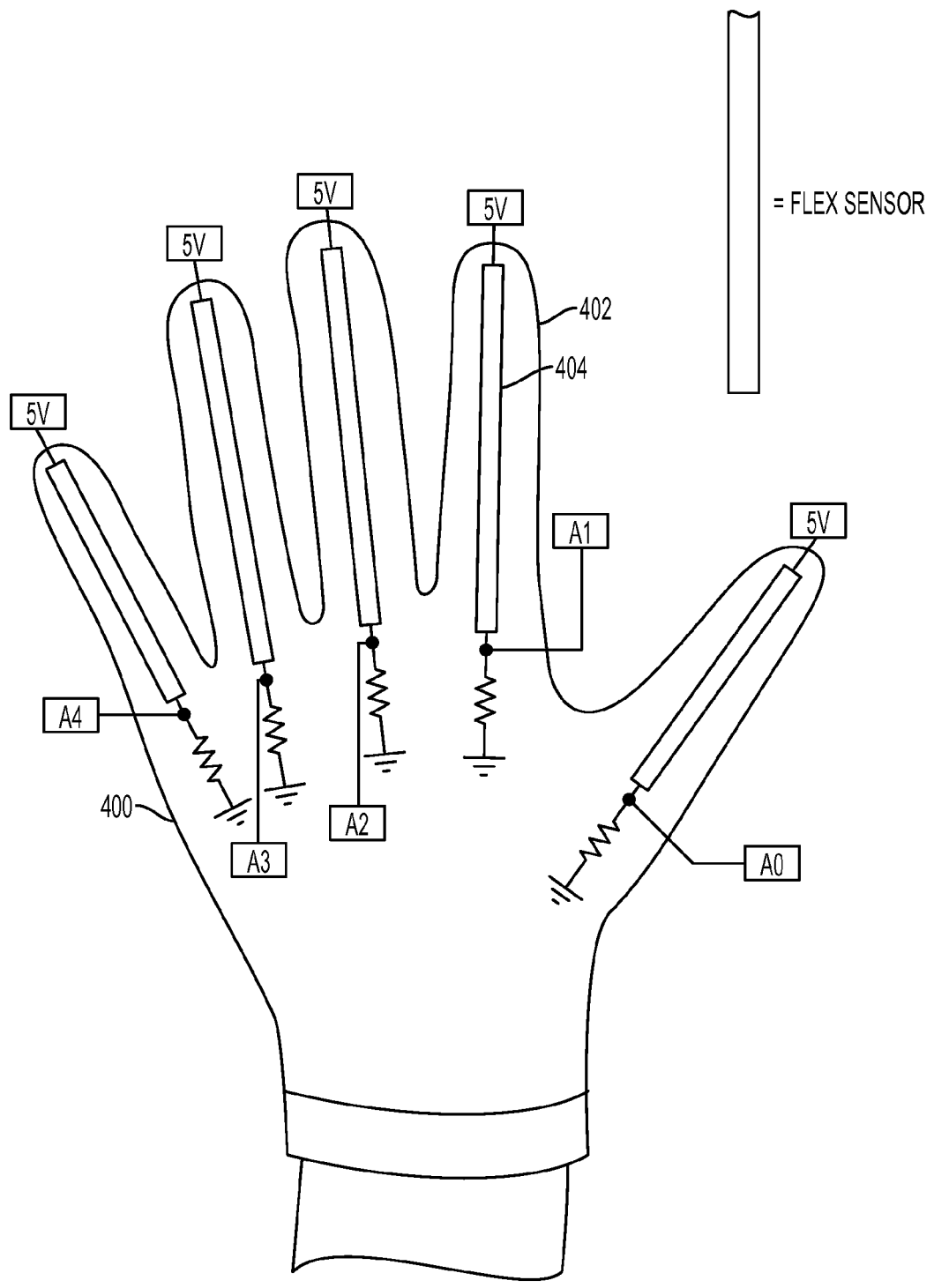
FIG. 4A illustrates a glove interface object incorporating a plurality of flex sensors, in accordance with an embodiment of the invention.

FIG. 4A illustrates a glove interface object incorporating a plurality of flex sensors, in accordance with an embodiment of the invention. FIG. 4A additionally schematically illustrates circuitry of the flex sensors, in accordance with an embodiment of the invention. As shown, the glove interface object 400 includes a flex sensor that is defined along the top surface of each of the fingers of the glove interface object 400. For example, the index finger 402 includes a flex sensor 404 that extends from the base of the index finger 402, that is where the knuckle of the index finger would be present, to the tip of the index finger 402. In the illustrated embodiment, the flex sensors are positioned along the top surface of each of the fingers of the glove interface object, which correlates to the top side of the user's fingers, i.e. the back of the user's hand (opposite the palm side of the user's hand). However, it will be appreciated that in other implementations the flex sensors can be positioned at other locations around the finger portions of the glove interface object, such as along the sides of the fingers or along the bottom of the fingers (i.e. the palm facing side of the fingers).

Each flex sensor is configured to detect flexion of a portion of the user's hand such as the user's fingers. In some embodiments, a flex sensor is defined to include a flex sensitive resistor, whose resistance changes based on the amount of flexion of the resistor. Examples of flex sensors are known in the art, and include those manufactured and/or sold by Spectra Symbol, etc. In some implementations, as the flexion of the flex sensitive resistor increases, the resistance of the resistor increases. With continued reference to FIG. 4A, each flex sensor is connected to a single analog input (A0-A5), yielding a total of five analog inputs. It will be appreciated that any type of flex sensor that is capable of detecting and/or quantifying flexion may be utilized for purposes of detecting flexion of a glove interface object.

Figure 4B:
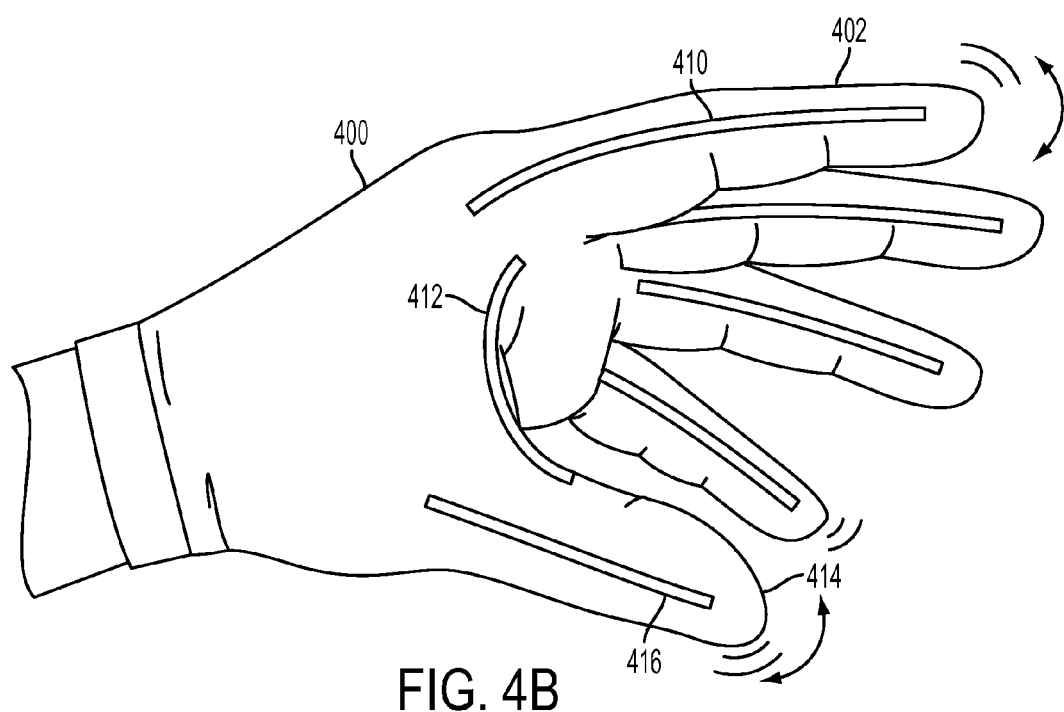
FIG. 4B illustrates a side view of a glove interface object having flex sensors defined thereon, in accordance with an embodiment of the invention.

FIG. 4B illustrates a side view of a glove interface object having flex sensors defined thereon, in accordance with an embodiment of the invention. In the illustrated embodiment, the index finger 402 of the glove interface object 400 has a flex sensor 410 defined along a side surface of the index finger 402. It may be advantageous to position flex sensors along side surfaces of the fingers of the glove interface object because the distance along the side of a given finger will not change as significantly as that of the top or bottom surface of the finger when it is flexed. Generally speaking, as the fingers are flexed (i.e. closed), the length along the top surface of the fingers increases, and the length along the bottom surface of the fingers decreases. Thus, when flex sensors are positioned along the top surface of the fingers, if they are substantially non-elastic, then the flex sensors may tend to pull back on the fingers, resisting their flexing.

FIG. 4B additionally illustrates a flex sensor 416 positioned along the thumb portion of the glove interface object 400. Also, a flex sensor 412 is positioned along the portion of the glove interface object that is between the index finger and thumb, so as to detect the flexion or spread between the index finger and thumb.

Figure 4C:
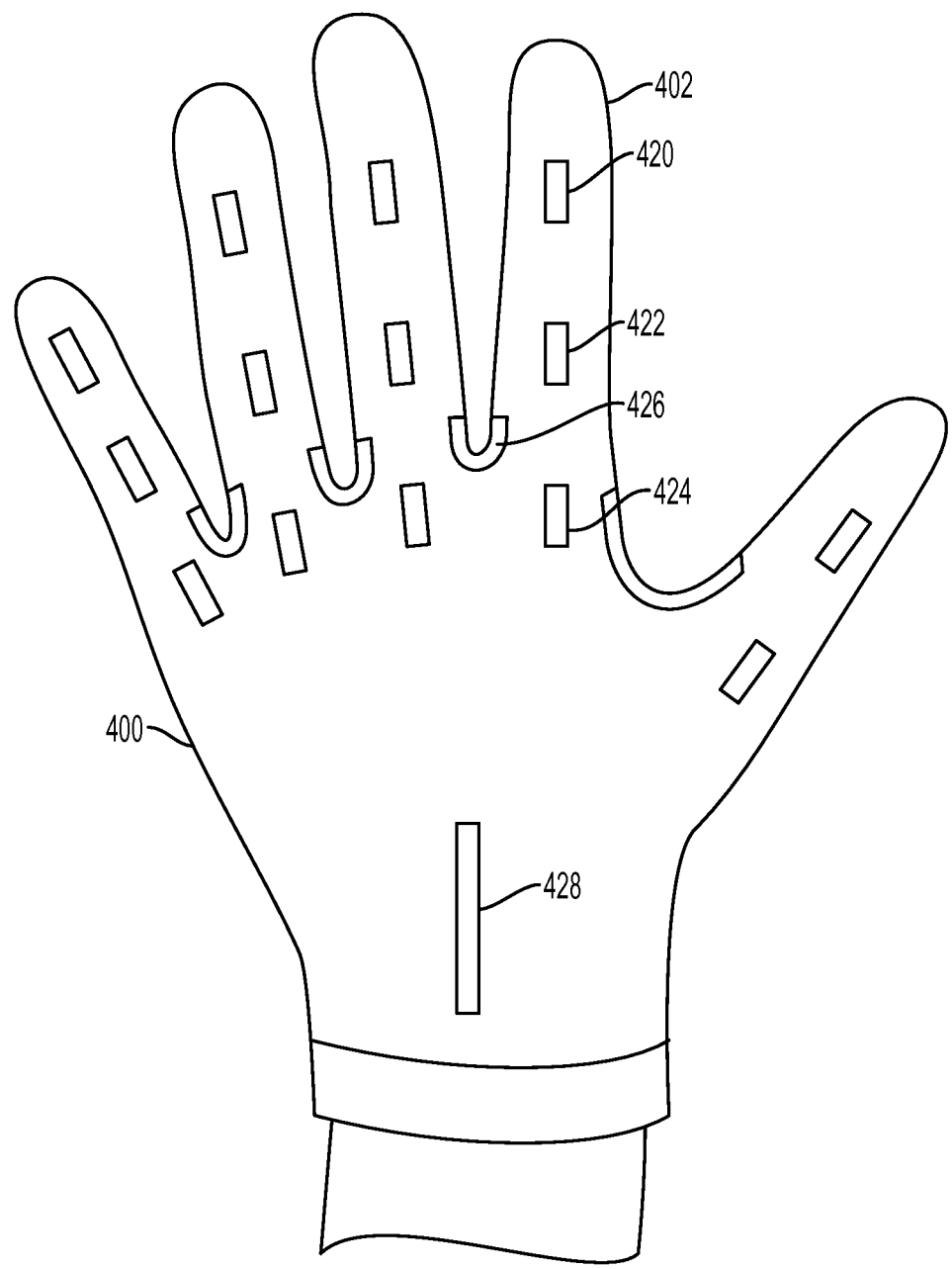
FIG. 4C illustrates a glove interface object having a plurality of flex sensors positioned at joint regions of the glove interface object, in accordance with an embodiment of the invention.

FIG. 4C illustrates a glove interface object having a plurality of flex sensors positioned at joint regions of the glove interface object, in accordance with an embodiment of the invention. In the illustrated embodiment, for example, the index finger portion 402 of the glove interface object includes: a flex sensor 420 positioned to detect flexion of the distal interphalangeal joint of the user's index finger, a flex sensor 422 positioned to detect flexion of the proximal interphalangeal joint of the user's index finger, and a flex sensor 424 positioned to detect flexion of the knuckle (metacarpal phalangeal joint) of the user's index finger. The other finger portions of the glove interface object 400 include similarly positioned flex sensors to detect flexion of the various joints of the fingers of the user's hand.

Additionally, flex sensors are located between the finger portions of the glove interface object 400, such as flex sensor 426, which is positioned to detect flexion or spreading between the index finger and middle finger. In the illustrated embodiment, other flex sensors are similarly positioned between adjacent fingers to detect the spread between the adjacent fingers.

Furthermore, a flex sensor 428 is positioned along a top wrist portion of the glove interface object 400, so as to detect flexion of the user's wrist. In some embodiments, a flex sensor is positioned along a bottom wrist portion of the glove interface object. In some embodiments, additional flex sensors may be positioned along the sides of the wrist to detect sideways flexion of the wrist.

In some embodiments, a calibration procedure is provided for calibrating the flex sensors of the glove interface object. For example, the calibration procedure may entail having the user operate the glove interface object so that the flex sensors are positioned in their least flexed positions, and/or their most flexed positions. Flex sensor data may be read at these positions to define upper/lower bounds and/or ranges of the flex sensor data for each flex sensor.

Figure 5A:
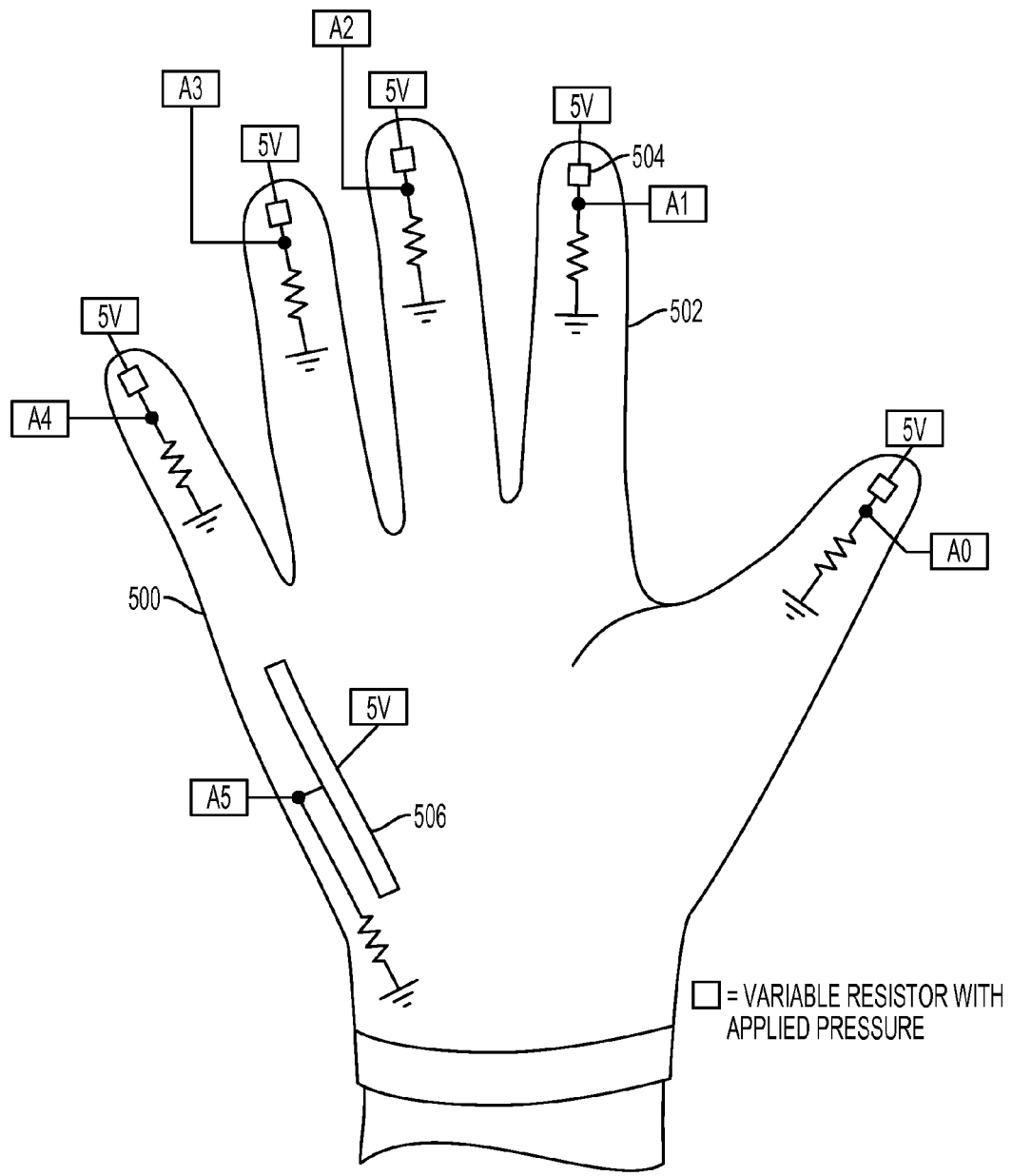
FIG. 5A illustrates a glove interface object having a plurality of pressure sensors, in accordance with an embodiment of the invention.

FIG. 5A illustrates a glove interface object having a plurality of pressure sensors, in accordance with an embodiment of the invention. FIG. 5A additionally schematically illustrates circuitry of the pressure sensors, in accordance with an embodiment of the invention. In the illustrated embodiment, pressure sensors are positioned at the fingertips of the glove interface object 500, to detect and/or quantify pressure applied when the fingertips are pressed against a surface. By way of example, the index finger portion 502 of the glove interface object 500 includes a pressure sensor 504.

In some implementations, a pressure sensor may be defined to include a pressure sensitive resistor, whose resistance changes as a function of pressure applied to the resistor. One example of a material having variable resistance with applied pressure is Velostat™. It will be appreciated that in other implementations, any suitable material may be utilized. With continued reference to FIG. 5A, each of the illustrated pressure sensors is configured as a voltage divider, each providing a signal to a respective analog input (A0 to A5).

In some embodiments, a calibration procedure is provided, wherein a user may initially press the pressure sensing regions of the glove interface object against a surface, as hard as they wish or are able, to define upper settings and/or ranges for the pressure sensors.

In the illustrated embodiment, in addition to pressure sensors located at the fingertips, a pressure sensor 506 is provided at the base of the palm region of the glove interface object.

Figure 5B:
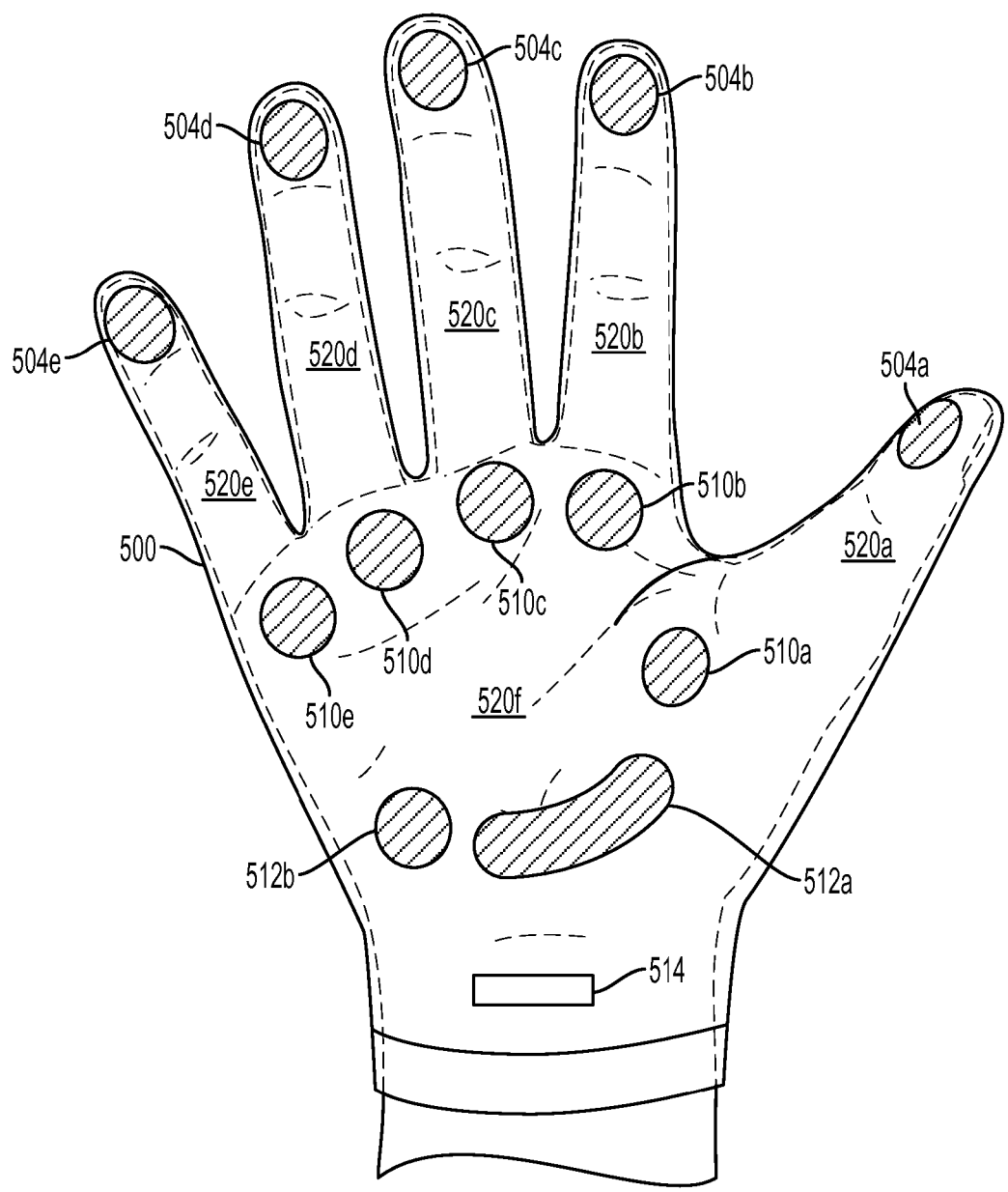
FIG. 5B illustrates a glove interface object 500 having a plurality of pressure sensors, in accordance with an embodiment of the invention.

FIG. 5B illustrates a glove interface object 500 having a plurality of pressure sensors, in accordance with an embodiment of the invention. Also shown is the user's hand 520 inside of the glove interface object 500. The user's hand 520 includes a thumb 520*a*, index finger 520*b*, middle finger 520*c*, ring finger 520*d*, and pinky/little finger 520*e*, as well as a palm 520*f*. Pressure sensors 504*a*, 504*b*, 504*c*, 504*d*, and 504e are defined at the fingertip portions of the glove interface object for the thumb, index finger, middle finger, ring finger, and pinkie finger, respectively.

Additionally, pressure sensors are defined at the base of the fingers, positioned to correspond to the inside (palm side) of the knuckle joints. By way of example, a pressure sensor 510b is positioned on the glove interface object to align with the inside of the knuckle of the user's index finger 520b, and detect/quantify pressure applied by the inside of the knuckle of the user's index finger (e.g. when it is pressed against a surface). Pressure sensors 510a, 510b, 510c, 510c, and 510e, correspond to the knuckles of the thumb, index finger, middle finger, ring finger, and pinkie finger, respectively. Pressure sensors 512a and 512b are positioned at the base of the palm region of the glove interface object 500, so as to detect pressure applied at the base of the user's palm.

The glove interface object 500 additionally includes and electronics/communications module 514, which can include various electronics for processing data from sensors of the glove interface object and for communicating with other devices such as a primary computing device. It should be appreciated that pressure sensors may be positioned on the glove interface object at any location, to detect and quantify pressure applied at these locations.

Figure 5C:
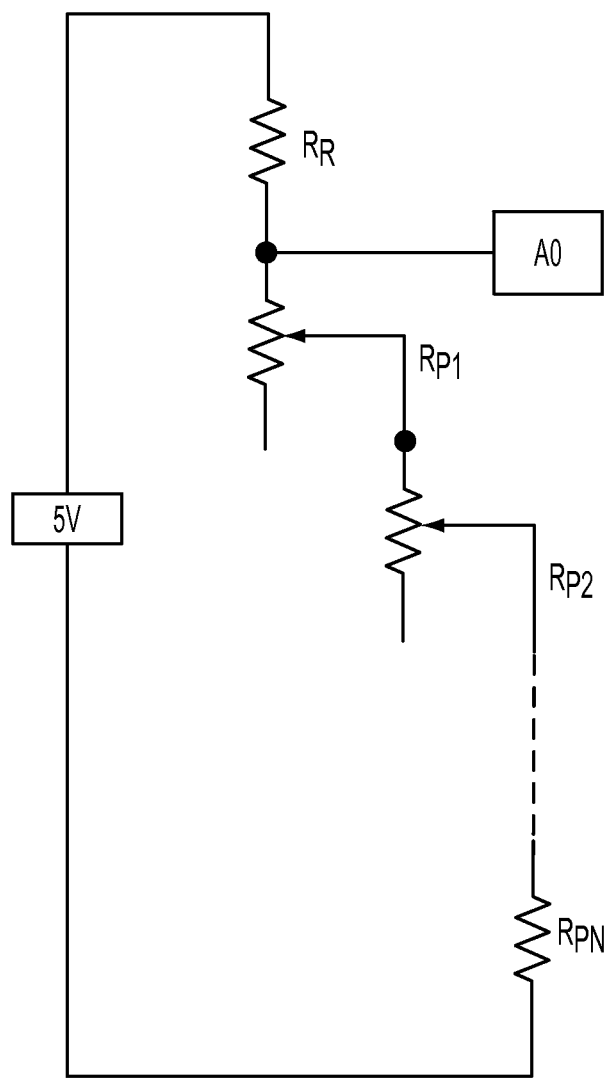
FIG. 5C is a schematic diagram illustrating a circuit for detecting pressure on a glove interface object, in accordance with an embodiment of the invention.

FIG. 5C is a schematic diagram illustrating a circuit for detecting pressure on a glove interface object, in accordance with an embodiment of the invention. In the illustrated embodiment, $R_R$ is a reference resistor, $R_{P1}$ is a first resistor for a first pressure point, $R_{P2}$ is a second resistor for a second pressure point, $R_{PN}$ is a $n^{th}$ resistor for a $n^{th}$ pressure point, A0 is an analog output, and 5V is a 5V power supply. Each of the pressure point resistors is a variable resistor whose resistance varies by pressure applied. As shown, the variable resistors are arranged in series, and the voltage is measured at another analog input. The serial arrangement provides for the pressure sensors to utilize only a single analog input. However, it may not be possible to determine which finger (or part of the hand) the pressure is coming from due to the serial configuration.

In some implementations, for a given pressure sensitive material, the resistance may vary inversely with the area. Therefore, to have equally weighted pressure points, it may be important to utilize a substantially similar or substantially the same size of material for each pressure point.

Figure 6A:
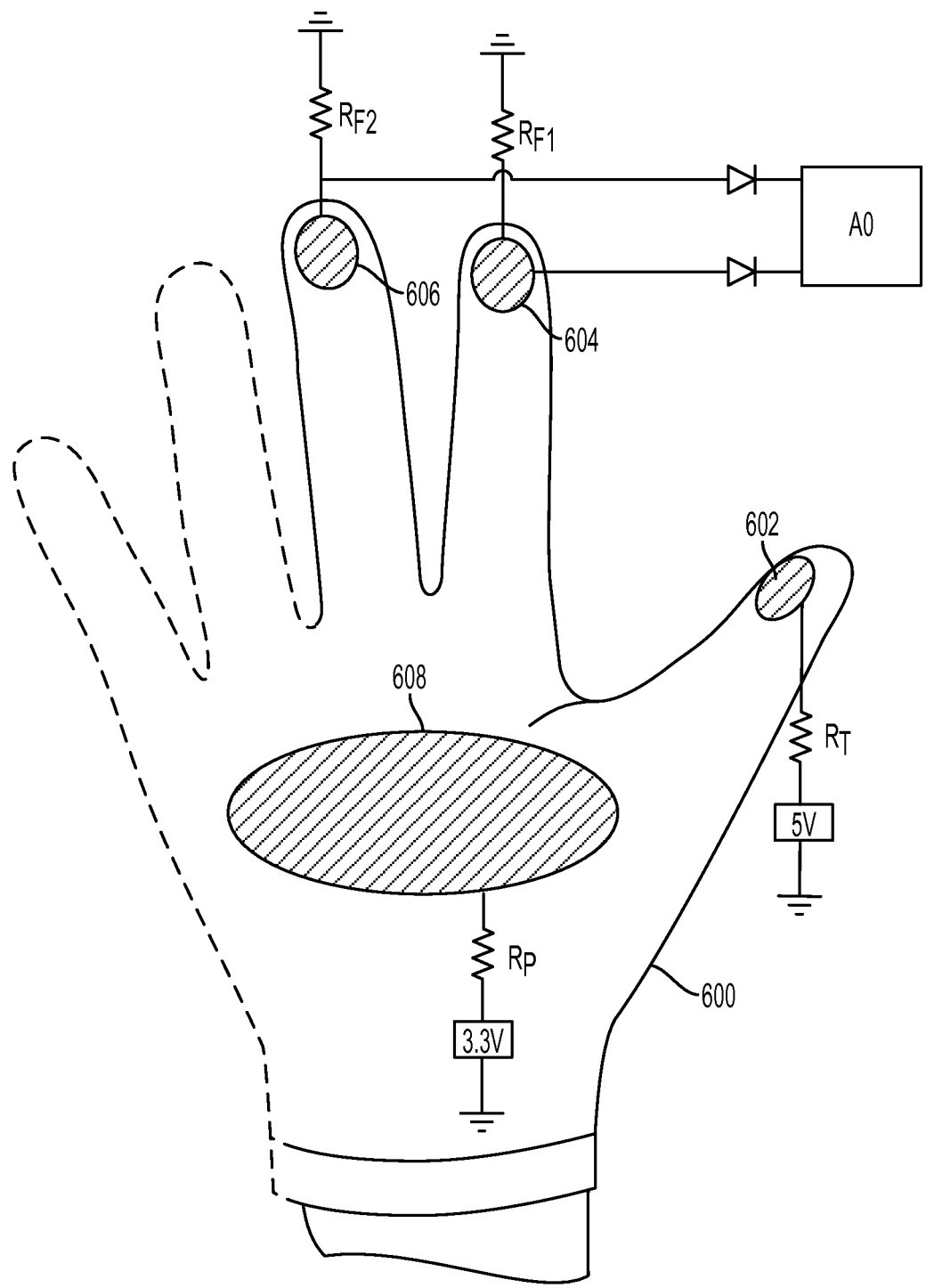
FIG. 6A is a schematic diagram showing a glove interface object having analog touch sensing circuitry, in accordance with an embodiment of the invention.

FIG. 6A is a schematic diagram showing a glove interface object having analog touch sensing circuitry, in accordance with an embodiment of the invention. The glove interface object 600 is configured to detect contact between parts of the same hand, such as between the thumb and another finger, or between a finger and the palm.

In the illustrated embodiment, a single analog input is utilized to detect various contact scenarios. Conductive pads are located on the fingertips and the palm region of the glove interface object 600. In the illustrated embodiment, a conductive pad 602 is located on the tip of the thumb, a conductive pad 604 is located on the tip of the index finger, and a conductive pad 606 is located on the tip of the middle finger, etc. A conductive pad 608 is located on the palm of the glove interface object 600. In some embodiments, the conductive pads are defined by a conductive fabric. However, in other embodiments, any conductive material suitable for providing a conductive surface on a glove interface object may be utilized. In preferred embodiments, the conductive material is flexible and deformable.

In one embodiment, the thumb pad 602 is connected to a 5V source; the palm pad 608 is connected to a 3.3V source; and each of the finger pads are connected to ground. Each of these connections is made through a resistor. The resistors have differing values such that the value read by A0 when two of the fingers are touching are distinct (analogous to voltage dividers), allowing various contact scenarios to be distinguished from each other, despite being read by the single analog input A0. The diodes are provided to only let a signal through to the analog input A0 if there is a signal going through the bus.

In one embodiment, the resistor values are as follows: $R_P$=0.33 kohm (palm); $R_T$=0.33 kohm (thumb); $R_{F1}$=22 kohm (index finger); $R_{F2}$=3.3 kohm (middle finger); $R_{F3}$=2 kohm (ring finger); $R_{F4}$=1.68 kohm (pinkie finger). Each contact or touch scenario is associated with a predefined voltage range. Thus, the voltage is read at the analog input A0, and correlated with the predefined voltage ranges to identify which contact scenario is occurring.

The voltages and resistance values provided with reference to the illustrated embodiment are provided by way of example, without limitation. In one embodiment, different voltages and resistances maybe employed to provide for detection of contact between the thumb or palm, and the index/middle/ring/pinkie fingers.

Figure 6B:
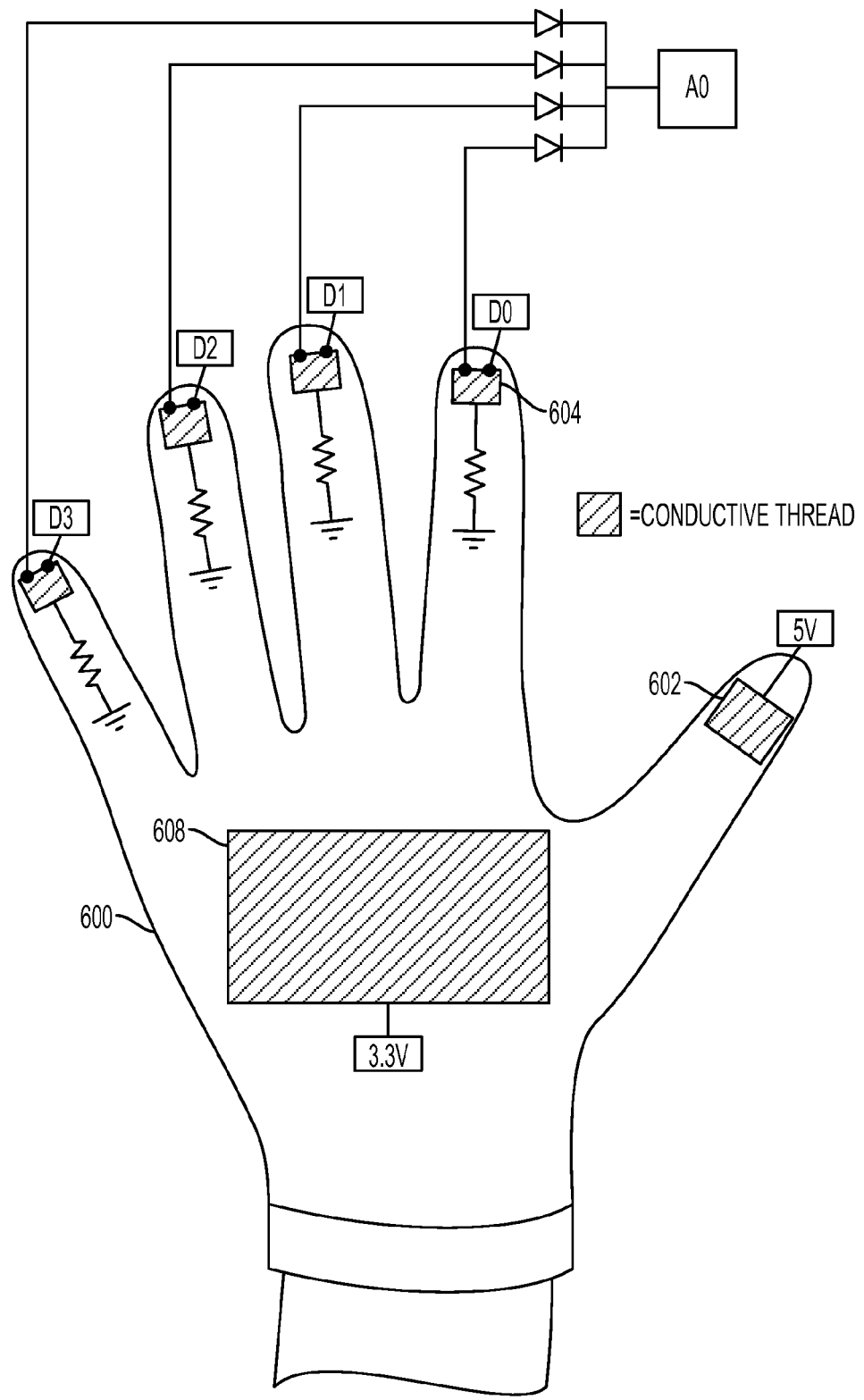
FIG. 6B is a schematic diagram illustrating a glove interface object having digital switches for detecting contact between different portions of the glove interface object, in accordance with an embodiment of the invention.

FIG. 6B is a schematic diagram illustrating a glove interface object having digital switches for detecting contact between different portions of the glove interface object, in accordance with an embodiment of the invention. In the illustrated embodiment, each of the index/middle/ring/pinkie finger pads is connected to a different digital input (D0 to D3). The resistors may have any value, and may have the same value in preferred embodiments (e.g. 10 kohm each). Each of the index/middle/ring/pinkie finger pads is also connected to the same analog input (A0) through respective diodes. The diodes prevent shorting by only conducting when a signal is present.

In operation, the digital inputs D0-D3 are read to determine whether contact between any of the index/middle/ring/pinkie fingers and either the palm or the thumb is occurring. The analog input A0 is read to determine whether the contact is with the palm or the thumb. In the illustrated embodiment, if A0 reads 5V, then contact is with the thumb; if A0 reads 3.3V, then contact is with the palm.

In one embodiment, an additional analog input A1 is connected to the palm pad 608. If A1 reads 5V, then it is determined that the thumb and palm are touching each other.

Voltages and resistance values provided herein are provided by way of example only, and not by way of limitation. In other implementations, any voltages and resistance values may be utilized which provide for the functionality discussed herein.

The use of digital inputs in the configuration of FIG. 6B can be advantageous over the configuration of FIG. 6A, as the voltages which must be distinguished from one another are significantly fewer, and can be configured to minimize susceptibility to fluctuations. The configuration of FIG. 6B thereby provides more stable sensing of contact events. Additionally, the illustrated embodiment provides for detection of contact between either the thumb or palm, and any of the index/middle/ring/pinkie fingers.

Figure 6C:
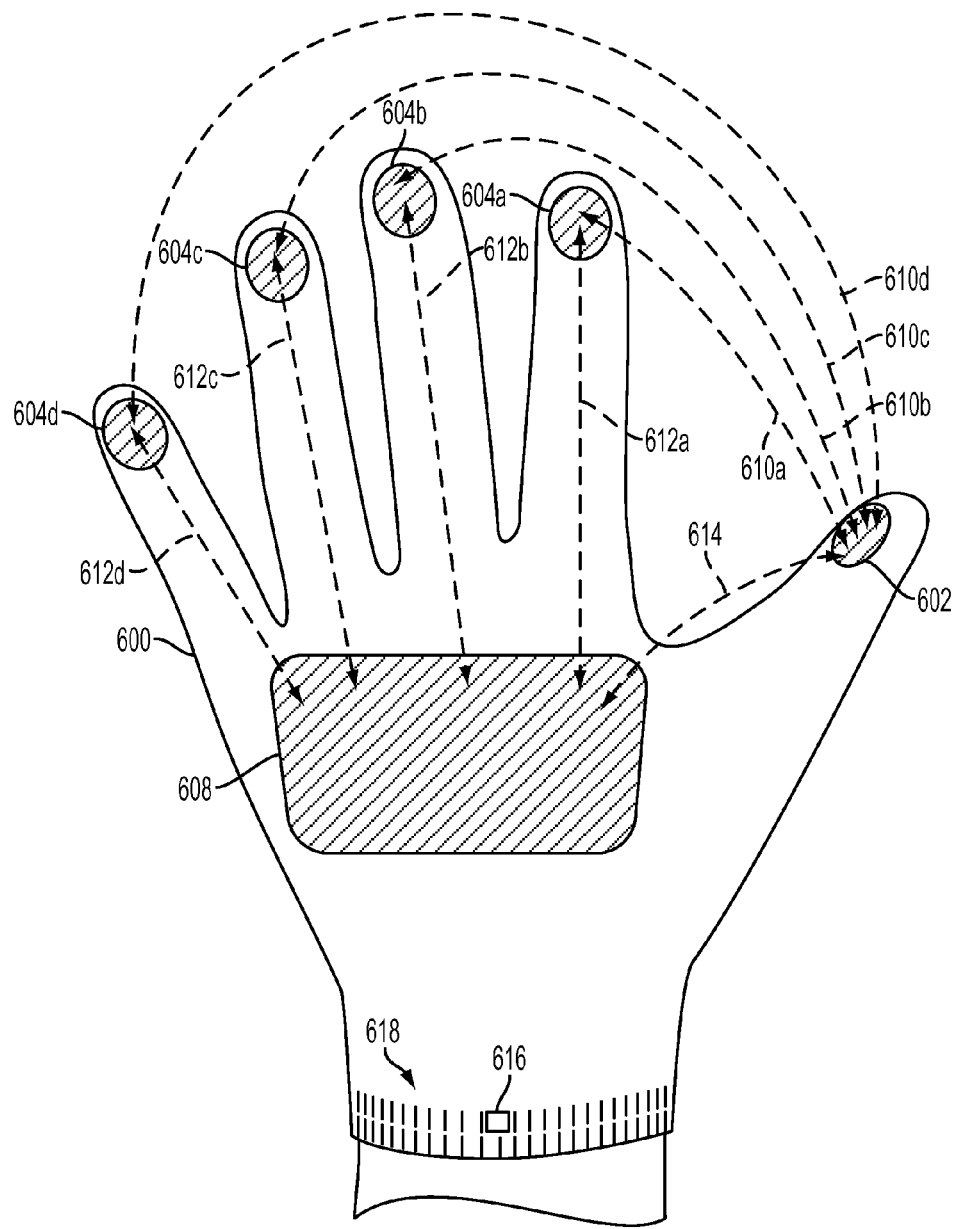
FIG. 6C illustrates a glove interface object 600 having conductive pads for detecting contact between portions of the glove interface object, in accordance with an embodiment of the invention.

FIG. 6C illustrates a glove interface object 600 having conductive pads for detecting contact between portions of the glove interface object, in accordance with an embodiment of the invention. As shown, a conductive pad 602 is located at the tip of the thumb portion of the glove interface object 600. Conductive pads 604a, 604b, 604c, and 604d are located at the tips of the finger portions of the glove interface object 600 for the index finger, middle finger, ring finger, and pinkie finger, respectively. Additionally, a conductive pad 608 is located on the palm region of the glove interface object 600.

In addition, various types of recognizable contact scenarios between the various conductive pads are illustrated. In accordance with embodiments of the invention, the following types of contact between conductive pads, as well as combinations thereof, can be recognized: thumb to index finger (reference 610*a*), thumb to middle finger (reference 610*b*), thumb to ring finger (reference 610*c*), thumb to pinkie finger (reference 610*d*), index finger to palm (reference 612*a*), middle finger to palm (reference 612*b*), ring finger to palm (reference 612*c*), pinkie finger to palm (612*d*), thumb to palm (reference 614).

Additionally, the principles discussed herein relating to detection of contact between different portions of a glove interface object may be extended to facilitate detection of contact between portions of different glove interface objects (e.g. left hand and right hand glove interface objects).

The glove 600 further includes a processing/communication module 616, that is configured to process data received from sensors on the glove interface object 600, such as the aforementioned pressure sensors, and also communicate with other devices such as a primary computing device. An elastic portion 618 of the glove interface object 600 is provided at the base of the glove interface object to facilitate a secure fit of the glove interface object on the user's hand.

In some implementations, to assist the user in making contact between any of the fingers and the palm, the glove interface object can be configured to have additional padding in the palm region. The conductive pad 608 for the palm is therefore elevated away from the user's palm by the additional padding, so that it is easier for any of the fingers to contact the palm. In another implementation, the additional padding can be defined by an inflatable device embedded in the palm region of the glove interface object. The inflation of the inflatable device can be controlled by a videogame to provide a sensation of an object being held in the hand.

Figure 7A:
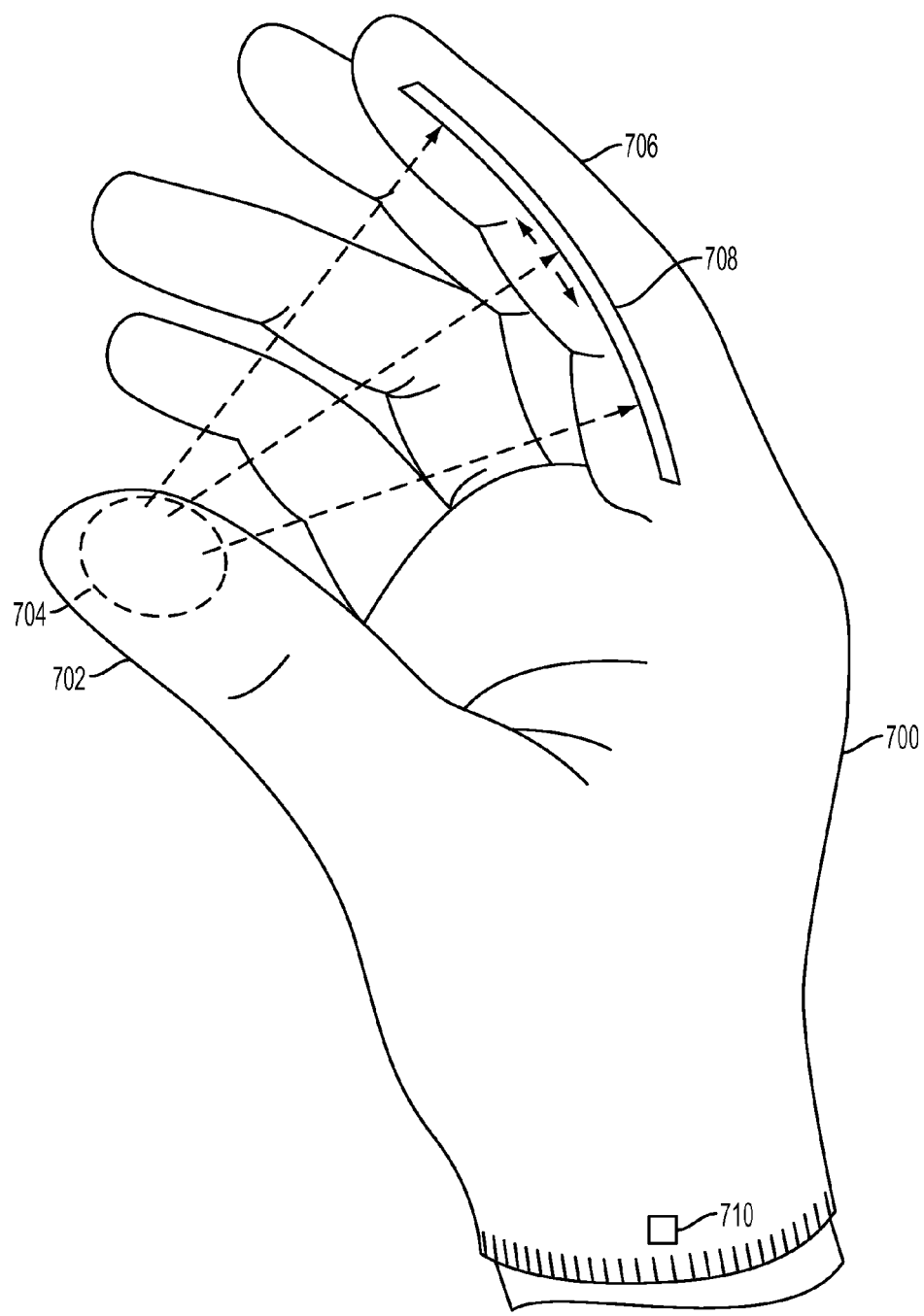
FIG. 7A illustrates a glove interface object implementing a trackpad using the side of the index finger and the thumb, in accordance with an embodiment of the invention.

FIG. 7A illustrates a glove interface object implementing a trackpad using the side of the index finger and the thumb, in accordance with an embodiment of the invention. The glove interface object 700 includes a conductive pad 704 located on the thumb portion 702. An index resistor 708 is defined along the side of the index finger portion 706 of the glove interface object 700. When the thumb pad 704 is brought into contact with the index resistor 708, the position of contact along the index resistor 708 can be determined, and utilized as input for an interactive application such as a video game. Furthermore, movements of the thumb along the index finger can also be detected/identified and utilized for interaction. The position of contact can be determined in different ways in accordance with different embodiments, as discussed in further detail below. The glove interface object 700 includes a module 710 for processing data defined by contact between the thumb pad 704 and the index resistor 708.

The position and movement of the thumb along the side of the index finger can be detected and applied for various purposes, including the following, without limitation: menu navigation/selection, volume control, slider control, variable control, setting adjustment, firing a weapon, charging a weapon/shield/attack/object, targeting a weapon, performing a gesture, swiping, revealing a menu or options, changing/swapping a weapon or object, etc. Furthermore, audio and/or haptic feedback can be provided as the thumb slides along the index finger. For example, a whooshing or swishing sound indicative of the movement of the thumb across the index finger can be provided. The sound indication may change in pitch as the thumb is repeatedly swiped across the index finger to further indicate to the user that a variable or setting is changing.

Figure 7B:
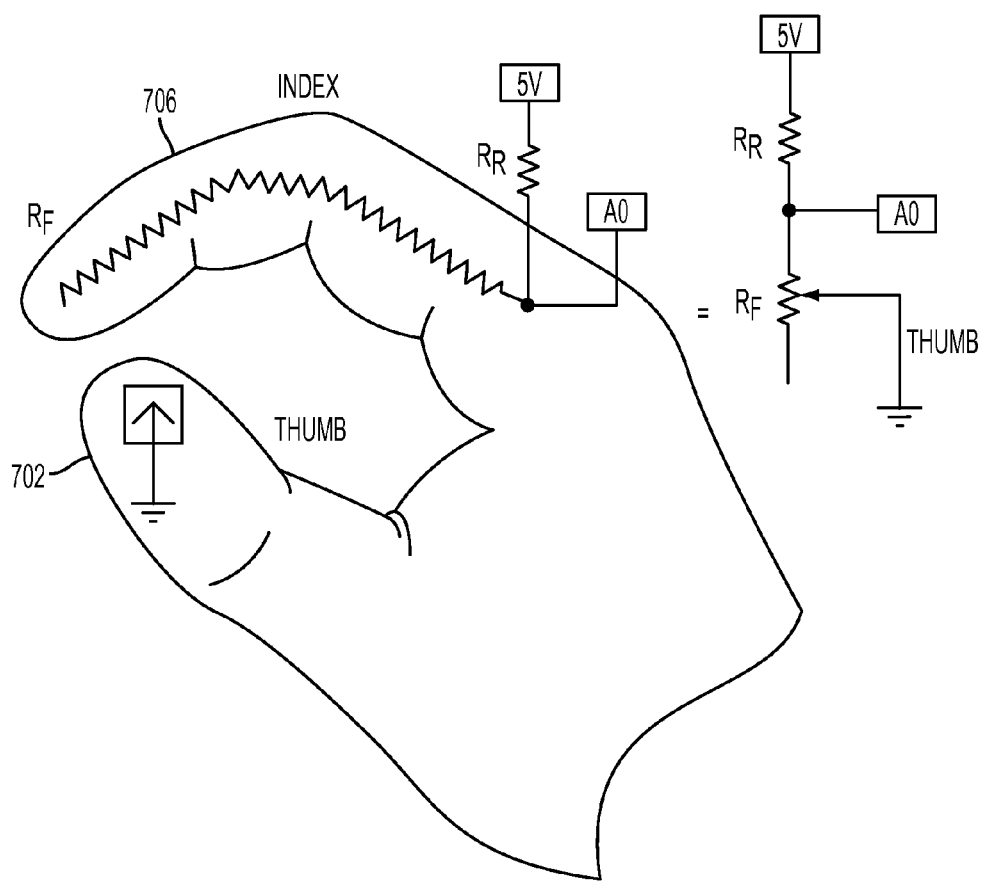
FIG. 7B is a schematic diagram illustrating circuitry for an index-thumb track pad, in accordance with an embodiment of the invention.

FIG. 7B is a schematic diagram illustrating circuitry for an index-thumb track pad, in accordance with an embodiment of the invention. In the illustrated embodiment, the index finger portion is configured as a fixed resistor, and the thumb acts as a selector, analogous to a potentiometer. The total resistance is defined across the length of the side of the index finger, and the thumb selects a portion of the resistance based on where along the length of the index resistor contact is made. As the point of contact moves from the proximal end of the index resistor towards the distal end of the index resistor, the effective resistance applied by the index resistor increases. Thus, the voltage read at the analog input A0 will vary depending upon the point of contact along the index resistor.

In various embodiments, a conductive material having a suitable resistance can be utilized to define the index finger resistor. In one embodiment, a conductive paint is utilized to define the index finger resistor (e.g. manufactured by Bare Conductive Ltd.). In other embodiments, other types of materials which may be fashioned along the index finger of the glove interface object to function as a fixed resistor can be utilized.

Figure 7C:
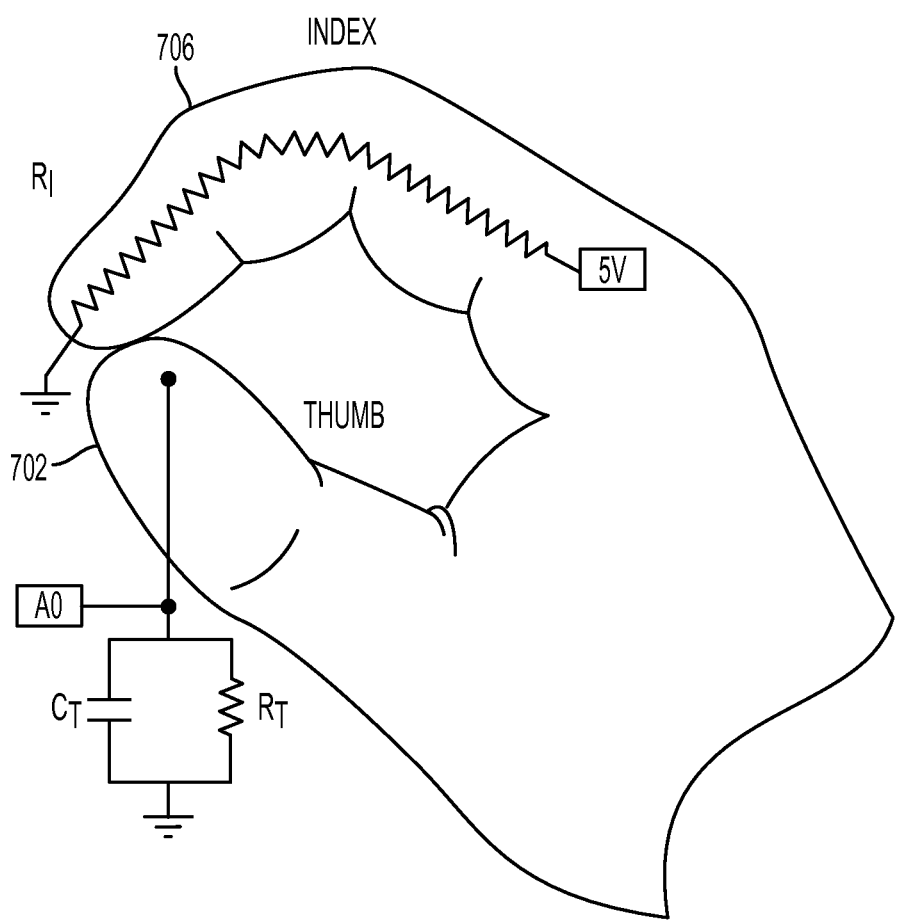
FIG. 7C is a schematic diagram illustrating circuitry for providing an index-thumb trackpad, in accordance with an embodiment of the invention.

FIG. 7C is a schematic diagram illustrating circuitry for providing an index-thumb trackpad, in accordance with an embodiment of the invention. In the illustrated implementation, the entire voltage is being dropped across the index resistor ($R_I$). The thumb functions as a probe, measuring the voltage at the point it touches without substantially affecting the currents and voltages in the index. This is achieved by utilizing a very large resistor at the thumb ($R_T$) to avoid leakage current when proving. It will be appreciated that the thumb is connected to ground, so that when the glove is turned on and the phone is not touching the index, the voltage read at the analog input A0 is 0V. Additionally, a capacitor is connected in parallel with RT to smooth the response. The capacitor also causes the last voltage read to be maintained for the time it discharges.

Though in the foregoing description, reference has been made to an index resistor configured along the outer side of the index finger portion of the glove interface object, in other implementations, other types of devices can be utilized to provide for detection of contact along the side of the index finger by the thumb. For example, any kind of touch sensitive surface can be defined along the side of the index finger, and touching of the thumb tip to the touch sensitive surface can be detected.

The index to thumb trackpad described herein provides an intuitive mechanism for user input to an interactive application. By determining and tracking the location of contact along the side of the index finger by the tip of the thumb, the user is able to provide a continuously adjustable input for interactivity, without holding any additional objects, simply by touching the thumb to the side of the index finger and sliding it along the side of the index finger if desired. The point of touch along the side of the index finger can be determined and applied to define the interactive input. Additionally, swipes across the side of the index finger by the thumb, either in the proximal to distal direction along the index finger, or in the distal the proximal direction along the index finger, can be detected and applied to define interactive input. By way of example, without limitation, swipes in a given direction may be detected and applied to perform various functions such as scrolling, moving an object, navigating a menu, etc.

Figure 7D:
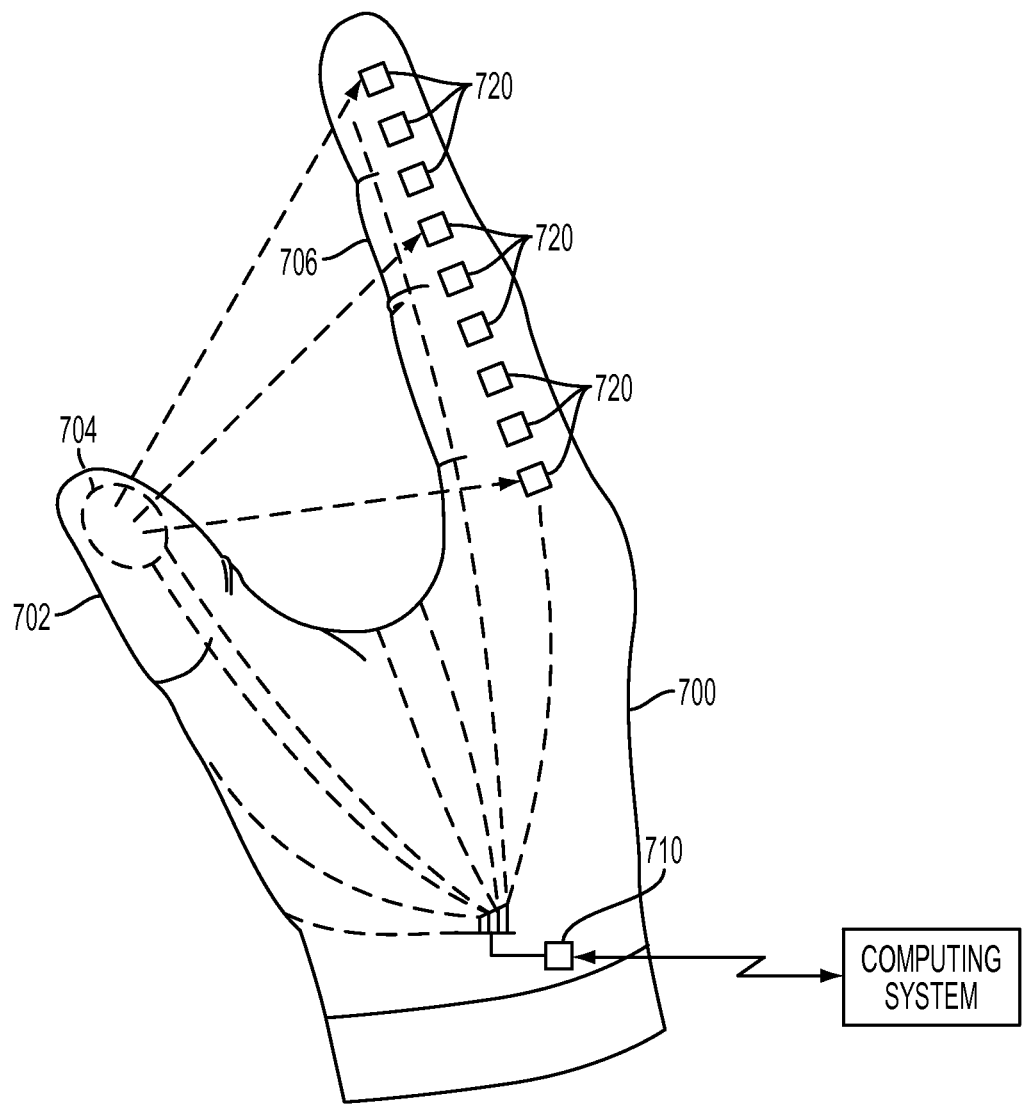
FIG. 7D illustrates a glove interface object 700 having a plurality of contact switches positioned adjacent to each other along the side of the index finger portion, in accordance with an embodiment of the invention.

FIG. 7D illustrates a glove interface object 700 having a plurality of contact switches positioned adjacent to each other along the side of the index finger portion, in accordance with an embodiment of the invention. The thumb portion 702 of the glove interface object 700 includes a thumb contact 74, and a plurality of index contacts 720 are defined along the side of the index finger portion 706. Each of the index contacts 720 can be connected to a digital switch to identify when a respective index contact is being touched by the thumb contact 704.

Figure 7E:
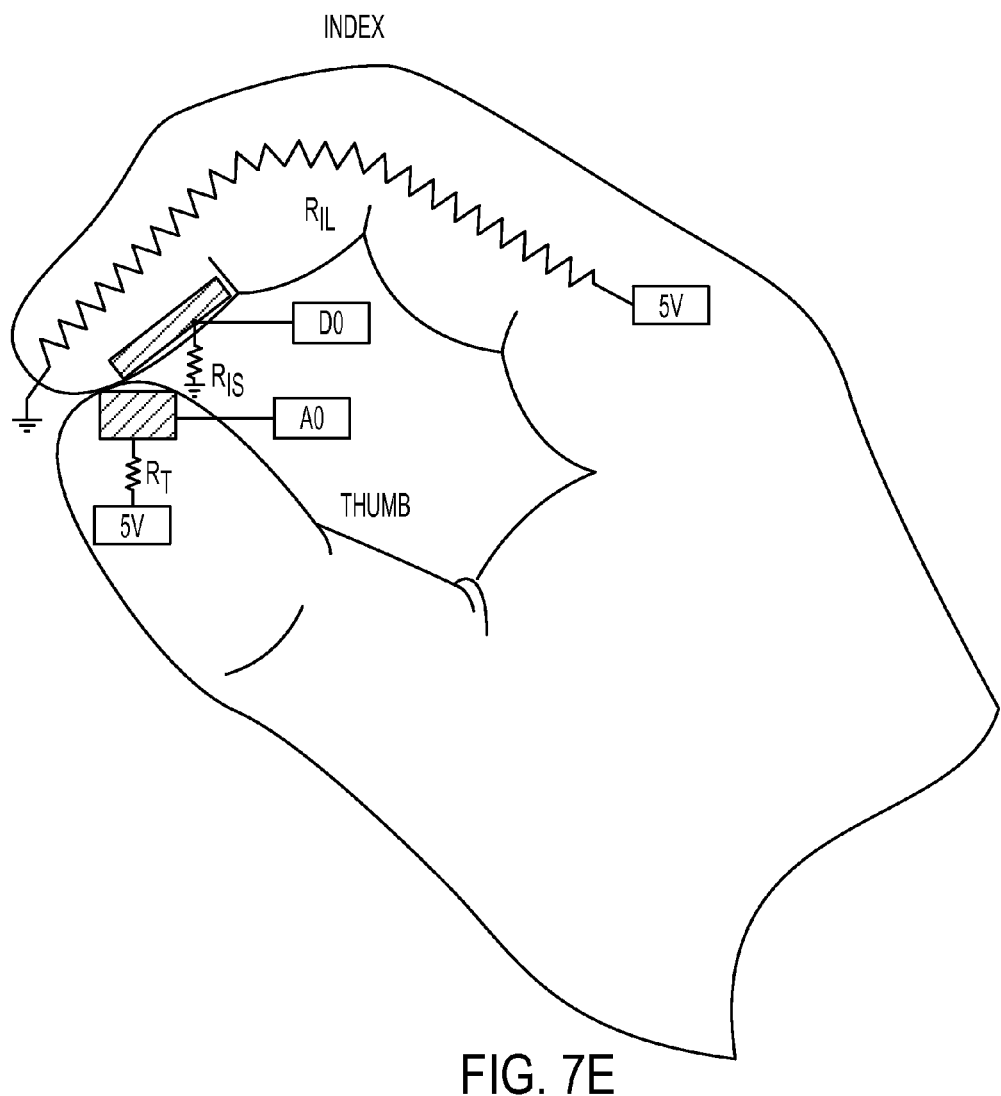
FIG. 7E is a schematic diagram illustrating circuitry for integrating the functionality of the aforementioned index thumb trackpad with that of the touch switches described with reference to FIG. 6B, in accordance with an embodiment of the invention.

FIG. 7E is a schematic diagram illustrating circuitry for integrating the functionality of the aforementioned index thumb trackpad with that of the touch switches described with reference to FIG. 6B, in accordance with an embodiment of the invention. Broadly speaking, the thumb resistance RT is configured to be high enough to function as a probe for the index thumb touchpad, but small enough to be used for the touch sensing switches.

Figure 8A:
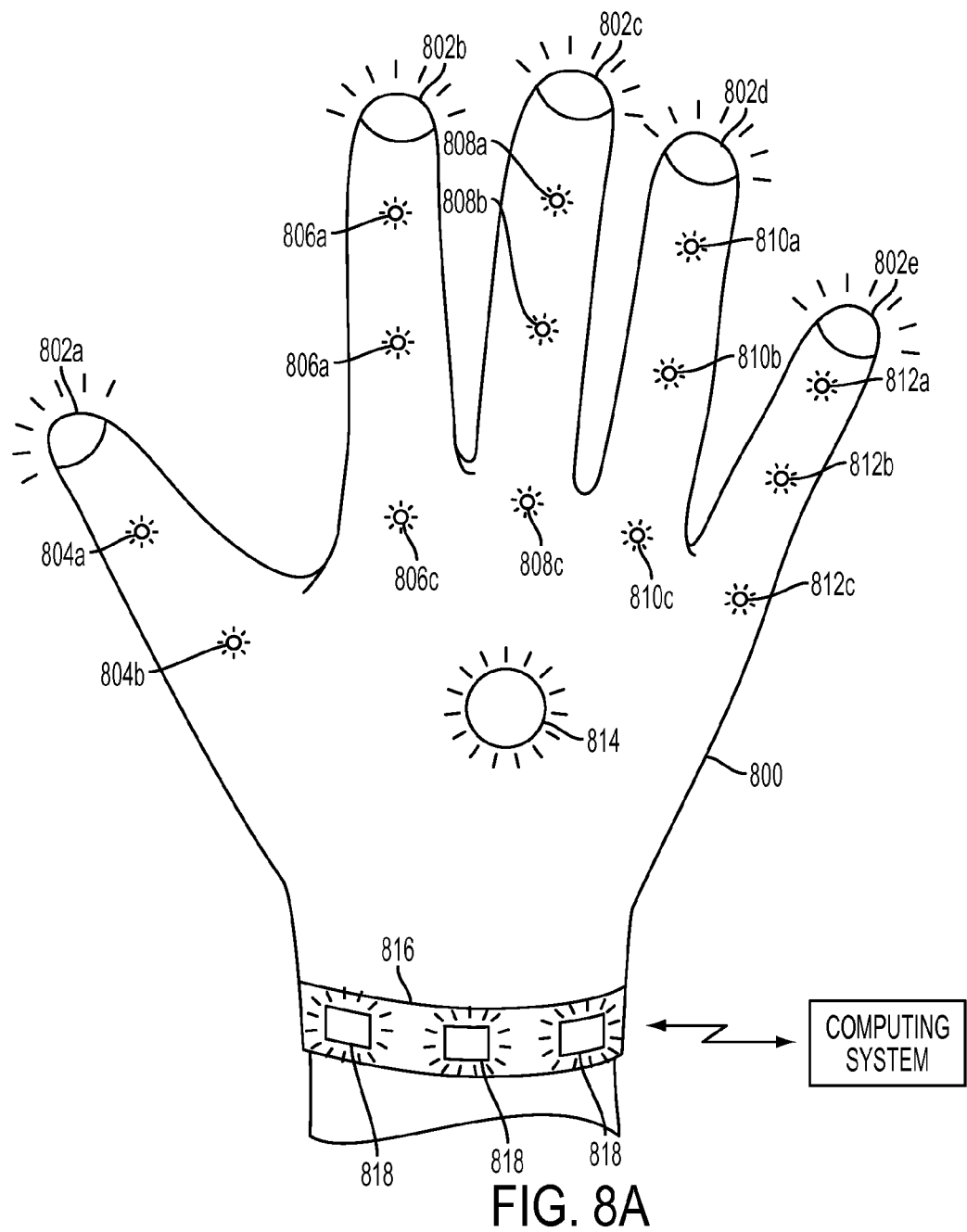
FIG. 8A illustrates a glove interface object 800 having a plurality of lights defined thereon, in accordance with an embodiment of the invention.

FIG. 8A illustrates a glove interface object 800 having a plurality of lights defined thereon, in accordance with an embodiment of the invention. As shown, various lights or illuminated objects or regions are defined at the fingertips and joint locations on the top surface of the glove interface object 800. More specifically, lights 802a, 802b, 802c, 802d, and 802e are defined at the fingertips of the glove interface object 800. Additionally, lights 804a and 804b are defined at the joint locations of the thumb; lights 806a, 806b, and 806c are defined at the joint locations of the index finger; lights 808a, 808b, and 808c are defined at the joint locations of the middle finger; lights 810a, 810b, and 810c are defined at the joint locations of the ring finger; lights 812a, 812b, and 812c are defined at the joint locations of the pinky finger.

A light 814 is defined on the back of the palm region of the glove interface object 800. Additionally, various lights 818 are provided on a bracelet 816. Though in the illustrated embodiment, lights are shown on the top surface of the glove, it should be appreciated that additional lights can be defined on the bottom surface of the glove and along side surfaces as well, such as along side surfaces of the fingers.

Captured images of the interactive environment including the glove interface object can be analyzed to identify the locations of the lights on the glove interface object, and thereby determine the location and orientation of the glove interface object in three-dimensional space. It should be appreciated that the lights can have various colors, and may be illuminated continuously or in a predefined pattern. Lights may be selectively illuminated for a given functionality, for example, to facilitate identification and/or tracking of a specific finger.

In some implementations, various portions of the lights can be illuminated in a sequential fashion to facilitate detection of specific portions of the glove interface object. For example, in one embodiment, during a first time period one or more lights on a first finger are illuminated (turned on for the duration of the first time period, and then turned off); during a successive second time period, one or more lights on the second finger are illuminated; etc. The sequence can be repeated in a cyclical fashion for each of the fingers. During each successive time period, the locations of the fingers is determined by analyzing captured images of the interactive environment and identifying the illuminated lights in the captured images, these being correlated to a specific finger during a respective time period for which the specific finger's lights are illuminated.

In some implementations, the cycling of the illumination of each of the fingers is synchronized to the frame rate of the image capture device that is utilized to capture images of the glove interface object in the interactive environment. Thus, by way of example, if the frame rate of the image capture device is 60 frames per second, and for each frame capture a single finger of the glove interface object is illuminated, then each of the five fingers of the glove interface object can be tracked (based on image capture alone) with a fidelity of 12 updates per second.

Figure 8B:
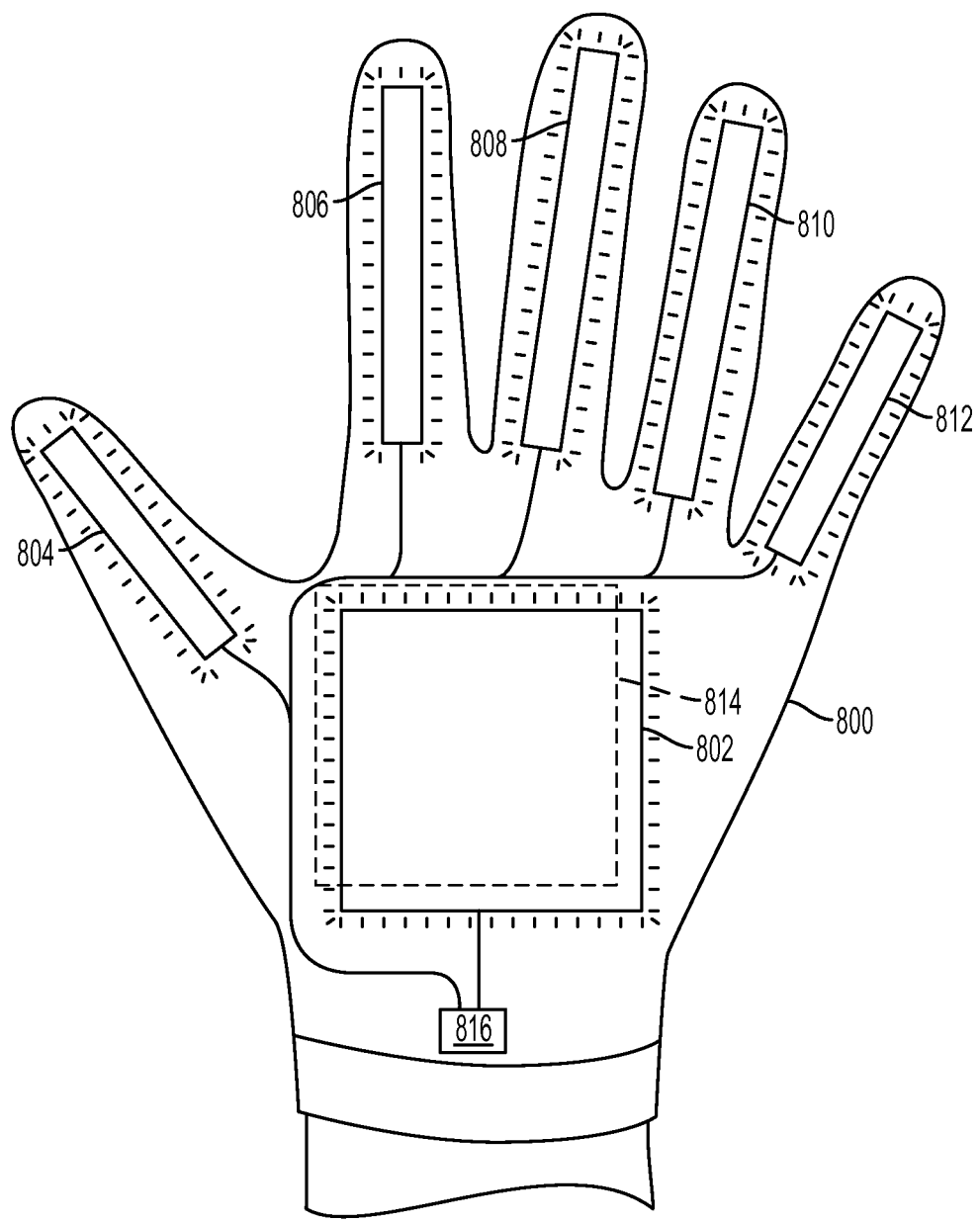
FIG. 8B illustrates a glove interface object 800 having various illuminated regions, in accordance with an embodiment of the invention.

FIG. 8B illustrates a glove interface object 800 having various illuminated regions, in accordance with an embodiment of the invention. In the illustrated embodiment, and illuminated region 802 is defined on the back of the palm region of the glove interface object 800. A corresponding illuminated region 814 may be defined on the front of the palm region of the glove interface object 800, opposite the region 802. Additionally, illuminated strips 804, 806, 808, 810, and 812 are defined along the lengths of the thumb, index finger, middle finger, ring finger, and pinky finger portions of the glove interface object 800. Each of these illuminated portions of the glove interface object can be controlled by a light controller 816.

In accordance with various implementations, the functionality of the glove interface object described herein can be applied in various ways for interaction with an interactive application such as a video game. Broadly speaking, the detection mechanisms herein described can be utilized to detect various hand poses, gestures, movements, etc. which can be applied as input for the videogame. FIGS. 9A, 9B, 9C, 9D, 9E, and 9F illustrate various hand poses detected from a glove interface object, and their application to define an interactive event in a virtual environment, in accordance with embodiments of the invention. In the embodiments described with reference to these figures, a user operates a glove interface object that controls a hand (or hand-like object, or other object) in a virtual environment. When the user forms certain poses with the user's hand, and these poses are detected from the glove interface object, objects may responsively be rendered in the virtual environment, optionally as being held by the hand in the virtual environment. The rendered objects can be controlled in response to further input from the glove interface object.

Figure 9C:
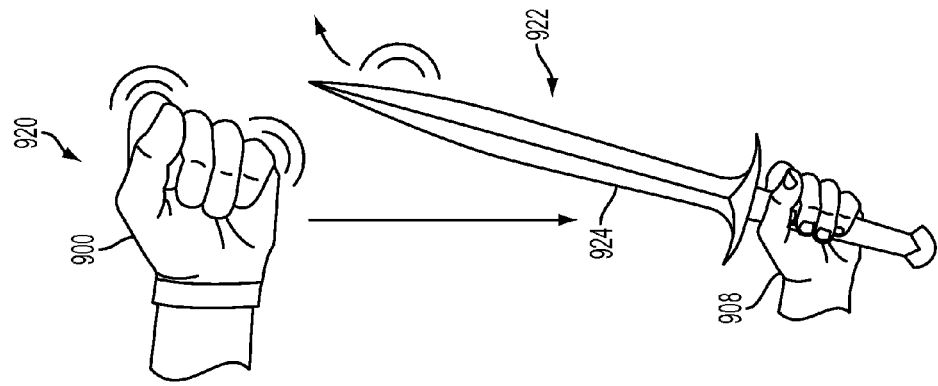
FIGS. 9A, 9B, 9C, 9D, 9E, and 9F illustrate various hand poses detected from a glove interface object, and their application to define an interactive event in a virtual environment, in accordance with embodiments of the invention.
Figure 9B:
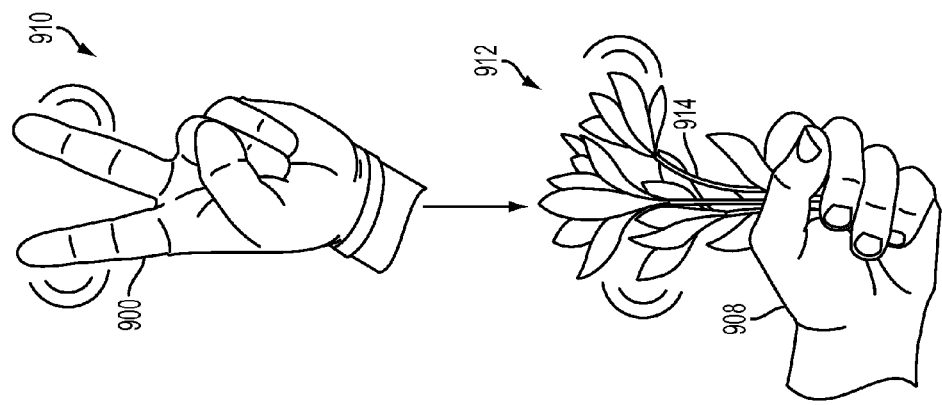
Figure 9A:
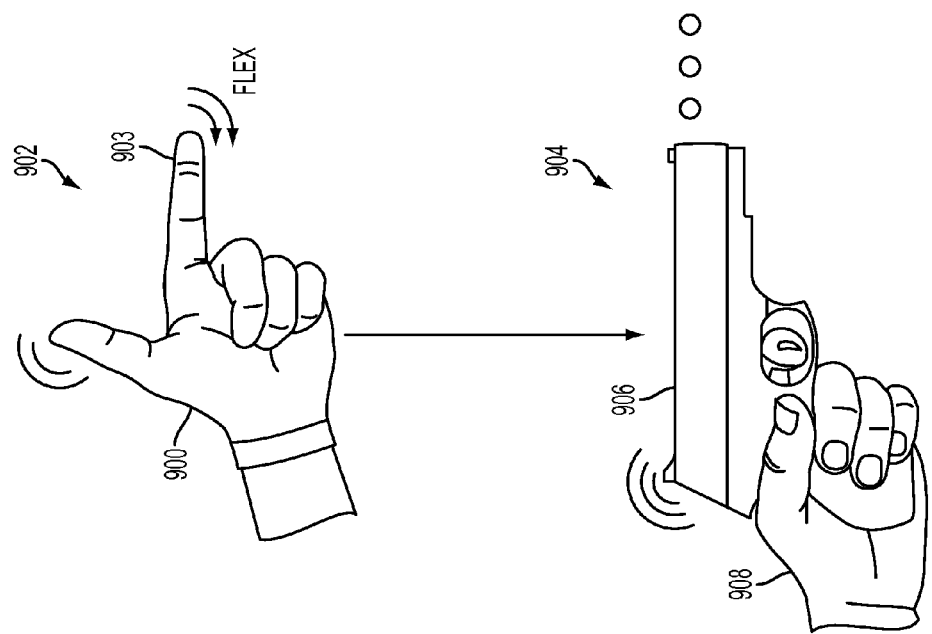

At FIG. 9A, as shown at reference 902, a user operates a glove interface object 900 and forms a gun pose, with the thumb and index finger extended, and the remaining fingers curled inward. In one embodiment, in response to detection of such a pose, a gun 906 is rendered in a virtual environment as shown at reference 904, the gun being held by the hand 908. The location and orientation of the gun 906 are controlled by the movements of the glove interface object 900. Additionally, in one embodiment, the gun 906 is fired by making a triggering motion with the glove interface object 900, that is, retracting the index finger 903.

At FIG. 9B, as shown at reference 910, a user operates the glove interface object 900 and forms a "V" pose (or "peace" pose) with their index and middle fingers extended, and the remaining fingers curled inward. In one embodiment, in response to detection of such a pose, flowers 914 are shown being held by the hand 908 in the virtual environment, as shown at reference 912. Movement of the user's hand effects movement of the hand 908 holding the flowers 914 in the virtual environment.

At FIG. 9C, as shown at reference 920, when the user forms a first pose while wearing the glove 900, then in response, a sword 924 is shown being held by the hand 908 in the virtual environment, as shown at reference 922. The movement of the sword can be controlled based on movements detected from the glove interface object 900.

Figure 9F:
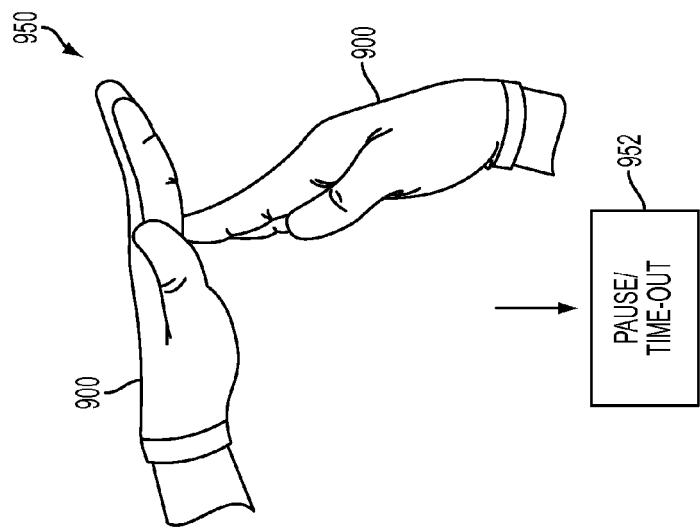
Figure 9E:
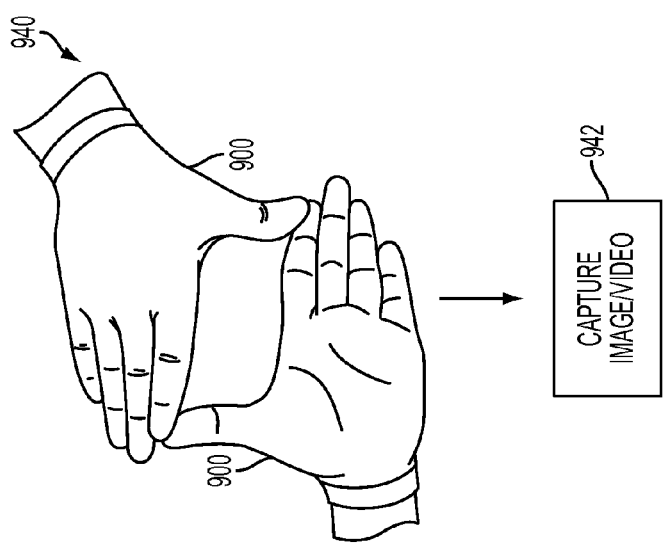
Figure 9D:
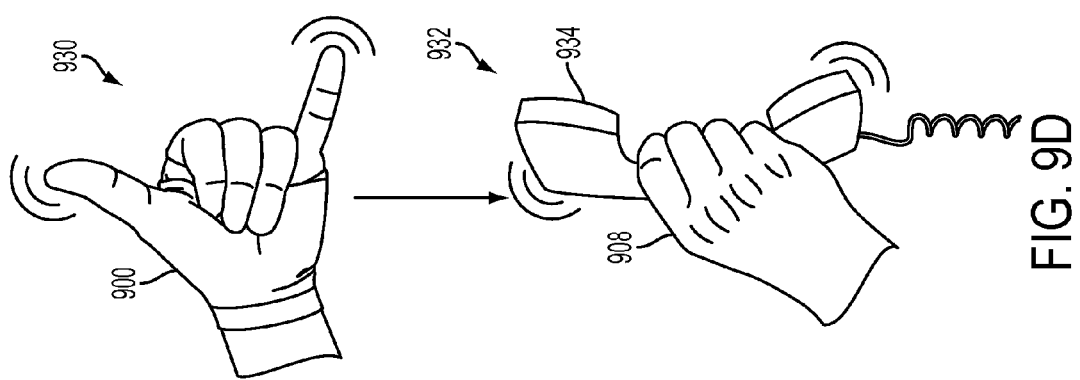

At FIG. 9D, at reference 930, the user forms a pose in which the thumb and pinky fingers are extended, with the remaining fingers curled towards to palm. In response to detection of such a pose, a phone 934 is shown being held by the virtual hand 908. The phone 908 can be maneuvered in the virtual environment by maneuvering the glove interface object in the real world.

In additional embodiments, gestures involving two hands (two glove interface objects) can be detected and applied. With reference to FIG. 9E, the two hands of the user are shown forming a "picture" pose, with the tips of the thumb and index finger of one hand touching the tips of the index finger and thumb, respectively, of the other hand. In one embodiment, in response to detection of such a pose, an image or video is captured of the view of the virtual environment. In one embodiment, the hands can be represented in the virtual environment, and the view for the image/video capture can be defined by the view through the frame formed by the hands in the virtual environment. In another embodiment, a screen capture is performed. In one embodiment, video capture is initiated when the pose is formed, and terminated when the pose is broken. In one embodiment, image capture is repeatedly performed until the pose is broken.

At FIG. 9F, as shown at reference 950, two hands are shown making a "T" sign, with at least one of the fingertips of one hand touching the palm of the other hand. In response to detection of such a pose, a video game may be paused, or a time-out may be called.

Figure 10A:
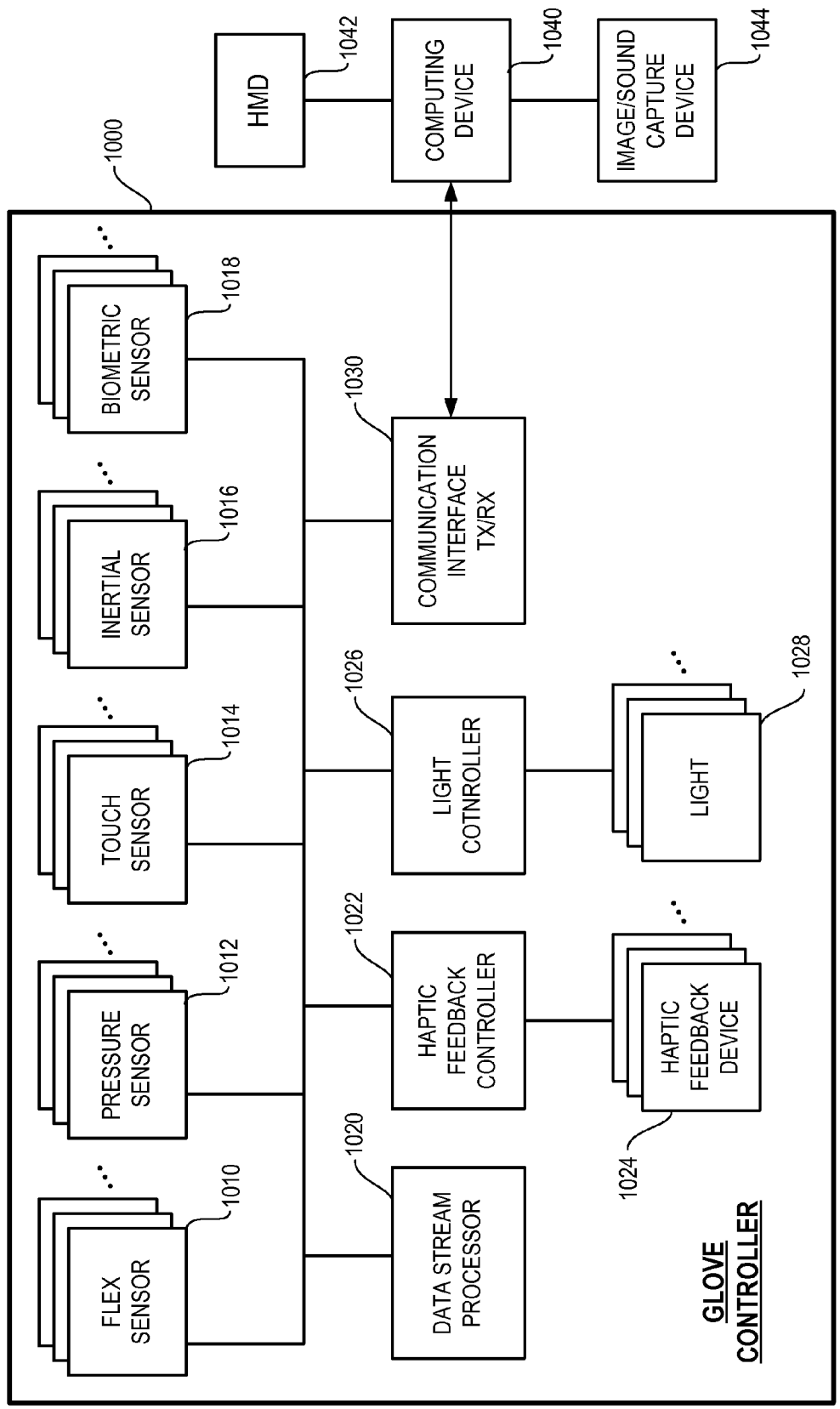
FIGS. 10A and 10B schematically illustrate a system for interfacing with an interactive application using a glove interface object, in accordance with an embodiment of the invention.

FIG. 10A schematically illustrates a system for interfacing with an interactive application using a glove interface object, in accordance with an embodiment of the invention. The glove interface object 1000 includes flex sensors 1010, pressure sensors 1012, touch switches 1014, inertial sensors 1016, and biometric sensors 1018. A data stream processor 1020 is configured to process data from the various sensors. It will be appreciated that in various embodiments, the data stream processor 1020 may process sensor data to various extents, including determining values quantifying sensed activity, identifying poses, gestures, movements, etc. A haptic feed back controller 1022 is configured to control the operation of haptic feed back devices 1024. A light controller 1026 is configured to control the operation of lights 1028. A communications interface is configured to communicate data to/from other devices.

A computing device 1040 is configured to execute a video game, and communicate with the glove interface object 1000. The video game is rendered on an display/HMD 1042. An image/sound capture device 1044 captures images and sound from the interactive environment in which the user is situated.

Figure 10B:
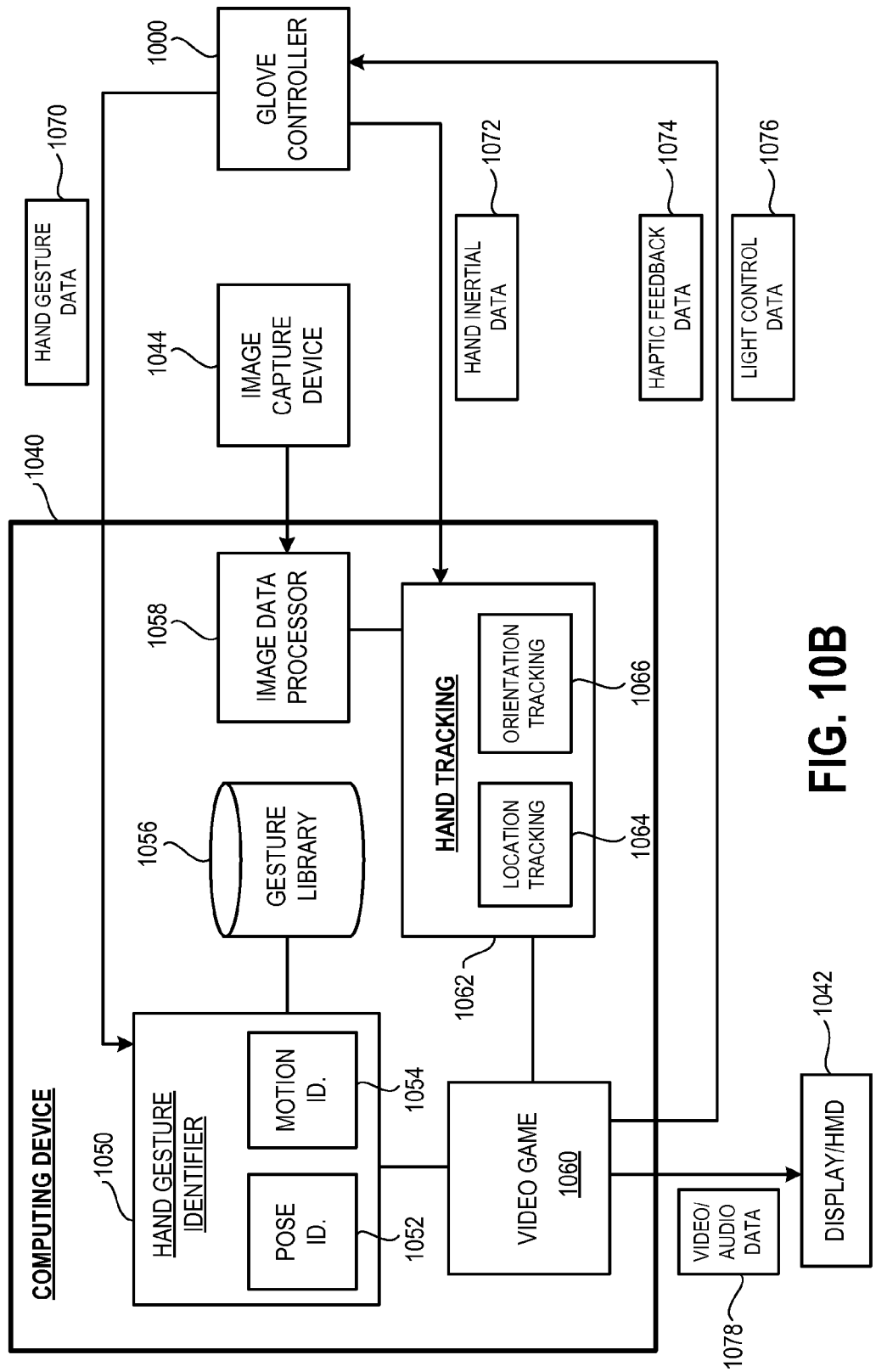

FIG. 10B illustrates additional components of the computing device 1040, in accordance with an embodiment of the invention. The glove interface object 1000 provides hand gesture data, detected/processed from the glove interface object's various sensors, to a hand gesture identifier 1050. The hand gesture identifier 1050 can define a hand pose identifier 1052 for identifying a pose of the user's hand, and a hand motion identifier 1054 for identifying dynamic movements of the user's hand, such as motion and/or changes in the pose of the user's hand. These define gestures detected from the glove interface object 1000 that are supplied to a video game 1060 as input. In one embodiment, a gesture library 1056 is provided, containing reference data defining various gestures, which may be utilized to identify gestures for the video game.

An image data processor 1058 processes images captured by the image capture device 1044, to identify trackable objects such as lights on the glove interface object 1000. The hand tracking processor 1062 is configured to perform location tracking 1064 and orientation tracking 1066 of the hand of the user, based on the identified trackable objects as well as inertial data 1072 from the glove interface object 1000. The location and orientation of the glove interface object (as defined by the user's hand) may also be provided as input to the video game 1060. The video game 1060 may generate haptic feedback data 1074 for transmission to the glove interface object 1000, which thereby produces the haptic feedback. The video game 1076 may also generate light control data 1076 for controlling the lights on the glove interface object 1000. Additionally, the video game 1060 generates video/audio data 1078 for rendering by the display/HMD 1042.

In some embodiments, the glove interface object is defined by an inner glove and an outer glove. The inner glove is removable and washable, whereas the outer glove contains the hardware for the glove interface object's functionality as described herein. Additionally, the inner glove may function as an insulator to insulate the hardware of the glove interface object from the user.

In some embodiments, haptic feedback can be provided by vibrating the fingertips at various frequencies to simulate textures as a user moves his fingers along a surface.

In some embodiments, force feedback mechanisms can be included in the glove interface object. Devices can be included which oppose motions of the user's hands/fingers, to simulate resistance encountered when making such motions. For example, a force feedback mechanism may oppose the motion of closing one's fingers, thus simulating the feel for grabbing/holding an object.

In some embodiments, pressure feedback mechanisms can be provided which apply pressure to at least a portion of the hand as a feedback mechanism. For example, a clamp may squeeze a finger as feedback, e.g. when touching a virtual object.

It should be appreciated that the input provided by the glove interface object can be applied to provide real-time control of an object in a virtual environment. In some embodiments, the input provided by the glove interface object provides control of a non-hand-like object in the virtual environment, such as enabling manipulation of the object. In some embodiments, the input provided by the glove interface object provides control of an arm or hand-like object of a character that is controlled by the user. When utilized in the context of presentation on an HMD device, the glove interface object can provide a highly immersive and intuitive experience with respect to control of an arm/hand or similar appendage of a character in the virtual environment. That is, the user can experience a sensation as if the virtual arm/hand or appendage really is their own arm/hand, resulting from the real-time control and responsiveness afforded by the glove interface object in combination with the highly immersive presentation of the HMD device.

Figure 11:
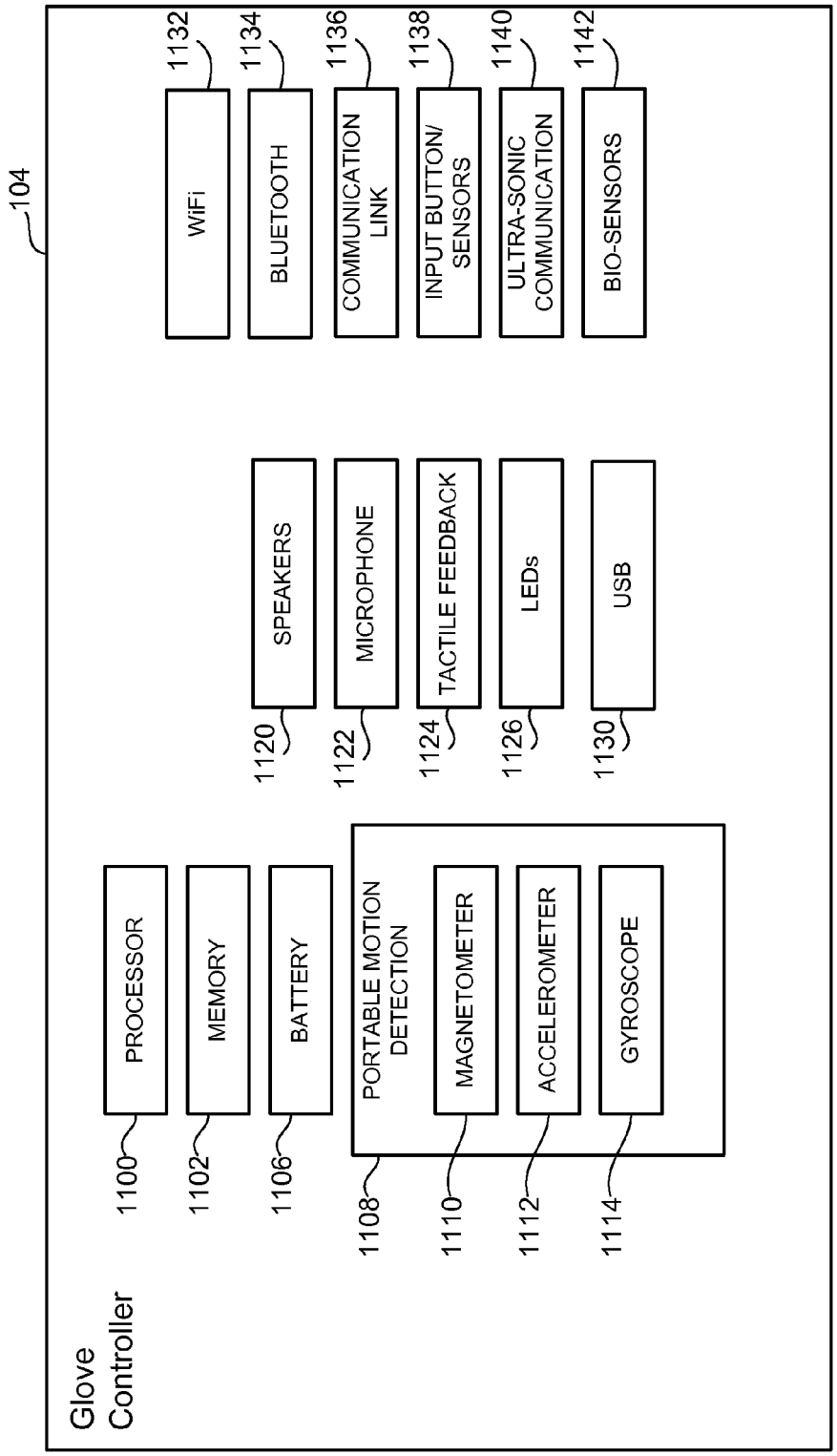
FIG. 11 illustrates components of a glove interface object, in accordance with an embodiment of the invention.

With reference to FIG. 11, a diagram illustrating components of a glove interface object 104 is shown, in accordance with an embodiment of the invention. The glove interface object 104 includes a processor 1100 for executing program instructions. A memory 1102 is provided for storage purposes, and may include both volatile and non-volatile memory. A battery 1106 is provided as a power source for the glove interface object 104. A motion detection module 1108 may include any of various kinds of motion sensitive hardware, such as a magnetometer 1110, an accelerometer 1112, and a gyroscope 1114.

The glove interface object 104 includes speakers 1120 for providing audio output. Also, a microphone 1122 may be included for capturing audio from the real environment, including sounds from the ambient environment, speech made by the user, etc. The glove interface object 104 includes tactile feedback module 1124 for providing tactile feedback to the user. In one embodiment, the tactile feedback module 1124 is capable of causing movement and/or vibration of the glove interface object 104 so as to provide tactile feedback to the user.

LEDs 1126 are provided as visual indicators of statuses of the glove interface object 104. For example, an LED may indicate battery level, power on, etc. A USB interface 1130 is included as one example of an interface for enabling connection of peripheral devices, or connection to other devices, such as other portable devices, computers, etc. In various embodiments of the glove interface object 104, any of various kinds of interfaces may be included to enable greater connectivity of the glove interface object 104.

A WiFi module 1132 is included for enabling connection to the Internet via wireless networking technologies. Also, the glove interface object 104 includes a Bluetooth module 1134 for enabling wireless connection to other devices. A communications link 1136 may also be included for connection to other devices. In one embodiment, the communications link 1136 utilizes infrared transmission for wireless communication. In other embodiments, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-sonic communication module 1140 may be included in glove interface object 104 for facilitating communication with other devices via ultra-sonic technologies.

Bio-sensors 1142 are included to enable detection of physiological data from a user. In one embodiment, the bio-sensors 1142 include one or more dry electrodes for detecting bio-electric signals of the user through the user's skin.

The foregoing components of glove interface object 104 have been described as merely exemplary components that may be included in glove interface object 104. In various embodiments of the invention, the glove interface object 104 may or may not include some of the various aforementioned components. Embodiments of the glove interface object 104 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 12:
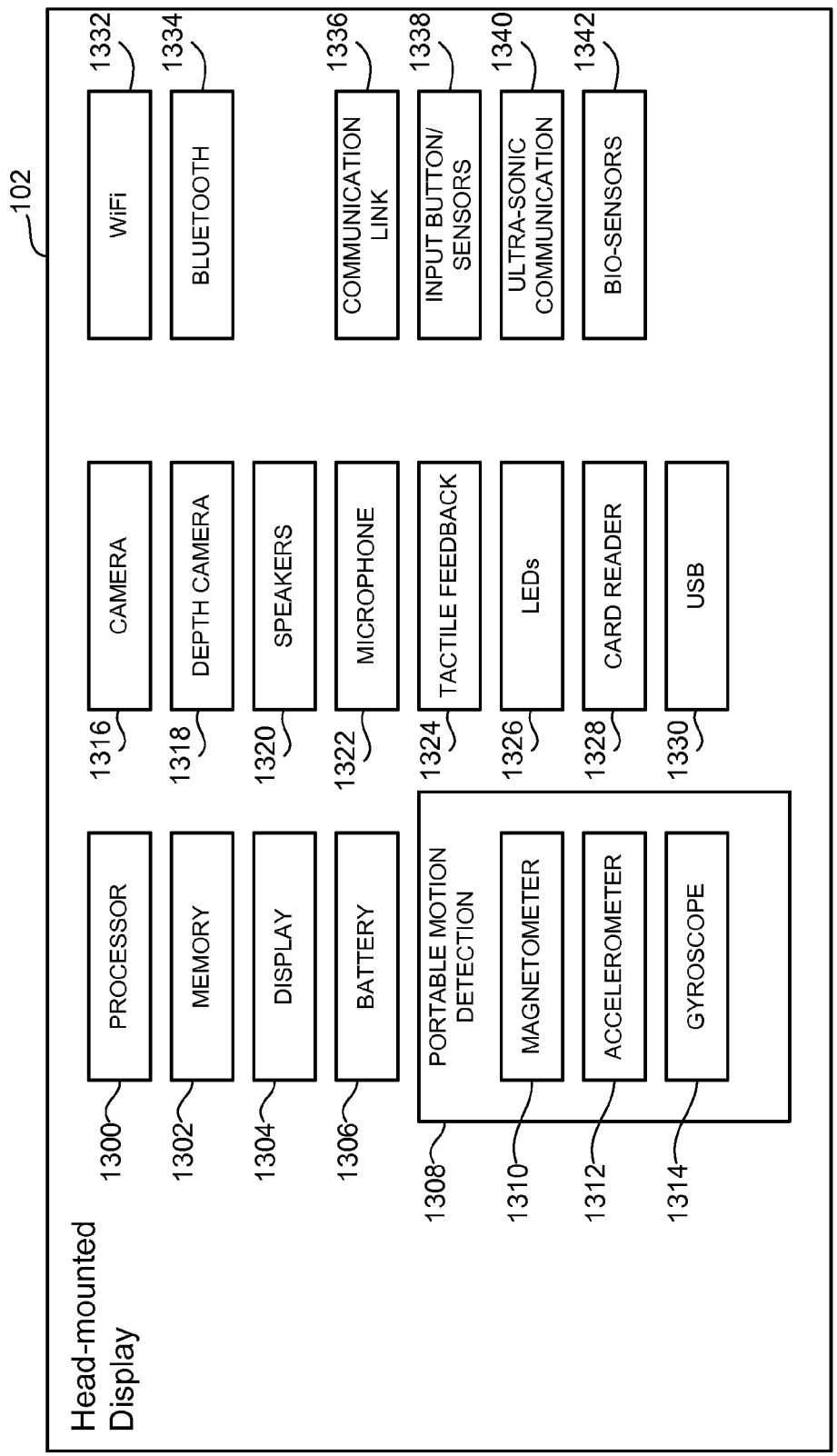
FIG. 12 illustrates components of a head-mounted display, in accordance with an embodiment of the invention.

With reference to FIG. 12, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 13:
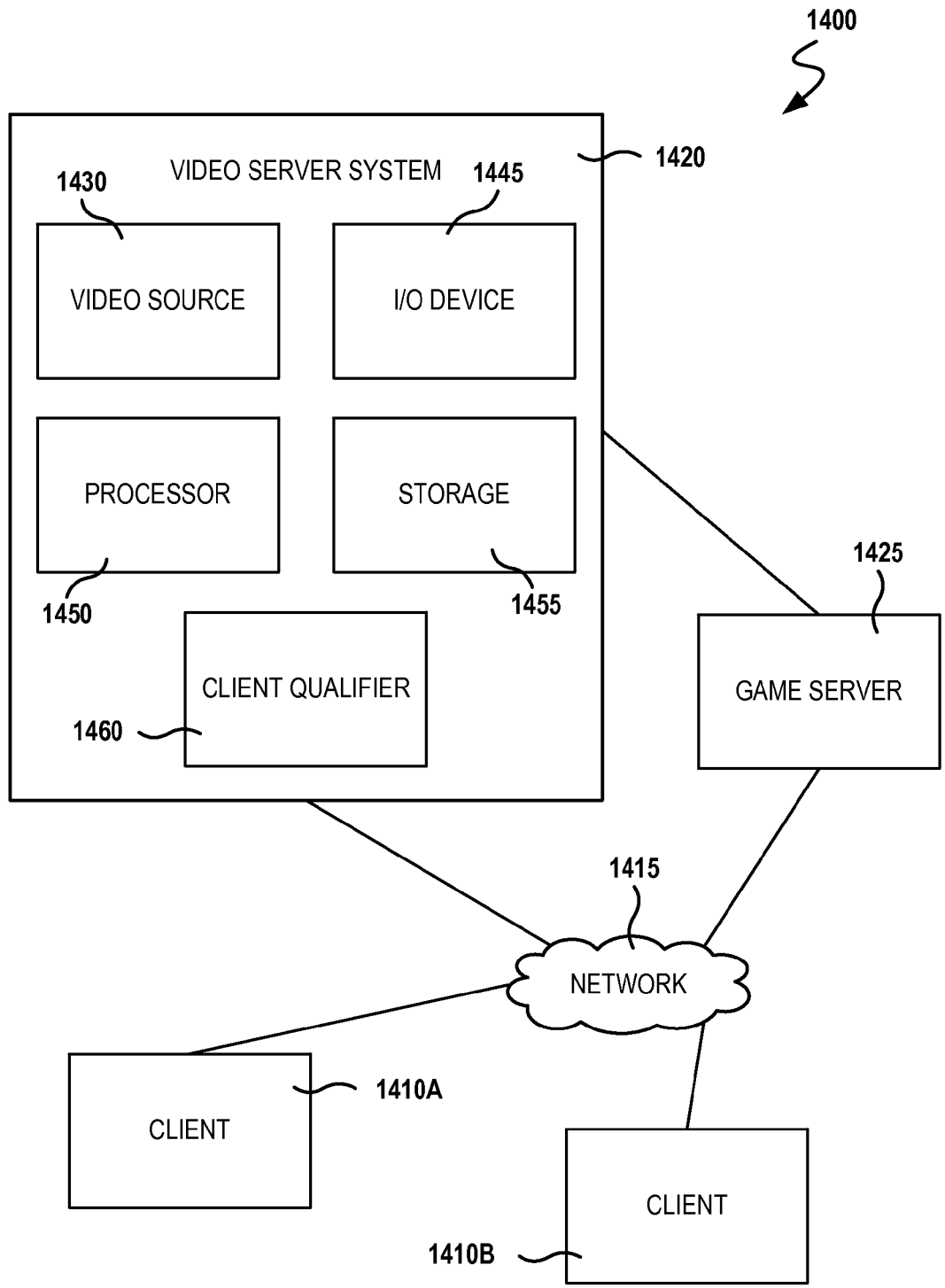
FIG. 13 is a block diagram of a Game System, according to various embodiments of the invention.

FIG. 13 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A., 1410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A glove interface object, comprising:
   at least one flex sensor configured to generate flex sensor data identifying a flex of at least one finger portion of the glove interface object;
   at least one contact sensor configured to generate contact sensor data identifying a contact between a first conductive pad defined on a first portion of the glove interface object and a second conductive pad defined on a second portion of the glove interface object, wherein the contact sensor data is generated in response to a detected signal that is triggered by the contact between the first conductive pad and the second conductive pad;
   wherein the contact sensor data includes data identifying contact between a thumb portion of the glove interface object on which the first conductive pad is defined and a fingertip portion of at least one other finger portion of the glove interface object on which the second conductive pad is defined, the first conductive pad having a voltage potential that is distinct from a voltage potential of the second conductive pad;
   a communications module configured to transmit the flex sensor data and the contact sensor data to a computing device for processing to determine a finger position pose of the glove interface object, the finger position pose being applied for rendering a virtual hand in a view of a virtual environment on a head-mounted display (HMD), the virtual hand being rendered based on the identified finger position pose.

2. The glove interface object of claim 1, wherein the contact sensor data includes data identifying contact between at least one finger portion of the glove interface object on which the first conductive pad is defined and a palm portion of the glove interface object on which the second conductive pad is defined.

3. The glove interface object of claim 1,
   wherein the view of the virtual environment is defined from a perspective of a virtual character in the virtual environment that is associated to the head-mounted display;
   wherein the virtual hand is a hand of the virtual character.

4. The glove interface object of claim 1, further comprising:
   a trackable object that is configured to be illuminated during interactivity, the trackable object configured to be identified from captured image data by the computing device to enable tracking of a location of the glove interface object in the interactive environment;
   wherein the virtual hand is rendered at a location in the virtual environment that is substantially defined by the location of the glove interface object in the interactive environment.

5. The glove interface object of claim 1, further comprising:
   at least one inertial sensor for generating inertial sensor data;
   wherein the communications module is configured to transmit the inertial sensor data to the computing device for processing to identify and track a location of the glove interface object in the interactive environment;
   wherein the virtual hand is rendered at a location in the virtual environment that is substantially defined by the location of the glove interface object in the interactive environment.

6. The glove interface object of claim 1,
   wherein the communications module is configured to receive haptic feedback data from the computing device;
   the glove interface object further comprising a haptic feedback mechanism that is configured to generate haptic feedback based on the haptic feedback data.

7. The glove interface object of claim 1, further comprising:
   at least one pressure sensor configured to generate pressure sensor data identifying a pressure applied to at least a portion of the glove interface object;
   wherein the communications module is configured to send the pressure sensor data to the computing device for processing to determine the finger position pose.

8. The glove interface object of claim 7,
   wherein the pressure sensor data quantifies an amount of force applied to the at least a portion of the glove interface object; and
   wherein the quantified amount of force defines a level of an action that is defined for the virtual environment.

9. The glove interface object of claim 1, wherein the HMD includes,
   a viewing module including an inner side having a view port into a screen configured for rendering image content that defines the view of the virtual environment;
   an HMD communications module for exchanging data with the computing device;

an image processing module for processing image data received from the computing device for rendering the image content on the screen;

a plurality of illuminating elements integrated with an exterior housing of the viewing module, the plurality of illumination elements defined for image tracking of the HMD by a camera;

illumination logic for controlling the plurality of illumination elements to be active or inactive; and at least one inertial sensor defined for inertial tracking of the HMD.

10. A method, comprising:

rendering a view of a virtual environment to a head-mounted display (HMD);

receiving flex sensor data from a glove interface object, the flex sensor data identifying a flex of at least one finger portion of the glove interface object;

receiving contact sensor data from the glove interface object, the contact sensor data identifying contact between conductive pads respectively defined on different portions of the glove interface object, wherein the contact sensor data is generated in response to detected signals that are triggered by the contact between the conductive pads, wherein different signals correspond to contact between different sets of the conductive pads, wherein the contact sensor data includes data identifying contact between a thumb portion of the glove interface object on which a first one of the conductive pads is defined and a fingertip portion of at least one other finger portion of the glove interface object on which a second one of the conductive pads is defined, the first conductive pad having a voltage potential that is distinct from a voltage potential of the second conductive pad;

processing the flex sensor data and the contact sensor data to determine a finger position pose of the glove interface object;

rendering in the view of the virtual environment a virtual hand, the virtual hand being rendered based on the identified finger position pose.

11. The method of claim 10, wherein the contact sensor data includes data identifying contact between at least one finger portion of the glove interface object on which a first one of the conductive pads is defined and a palm portion of the glove interface object on which a second one of the conductive pads is defined.

12. The method of claim 10, wherein the view of the virtual environment is defined from a perspective of a virtual character in the virtual environment that is associated to the head-mounted display;

wherein the virtual hand is a hand of the virtual character.

13. The method of claim 10, further comprising:

receiving captured image data of an interactive environment;

processing the captured image data to identify and track a location of the glove interface object in the interactive environment;

wherein rendering the virtual hand is at a location in the virtual environment that is substantially defined by the location of the glove interface object in the interactive environment.

14. The method of claim 10, further comprising:

receiving inertial sensor data from the glove interface object;

processing the inertial sensor data to identify and track a location of the glove interface object in the interactive environment;

wherein rendering the virtual hand is at a location in the virtual environment that is substantially defined by the location and orientation of the glove interface object in the interactive environment.

15. The method of claim 10, further comprising:

detecting contact between the virtual hand and a virtual object in the virtual environment;

generating haptic feedback data based on the detected contact between the virtual hand and the virtual object;

sending the haptic feedback data to the glove interface object.

16. The method of claim 10, further comprising:

receiving pressure sensor data identifying a pressure applied to at least a portion of the glove interface object;

wherein determining the finger position pose includes processing the pressure sensor data.

17. The method of claim 16, wherein the pressure sensor data quantifies an amount of force applied to the at least a portion of the glove interface object; and wherein the quantified amount of force defines a level of an action that is defined for the virtual environment.

18. The method of claim 10, wherein rendering the view of the virtual environment to the HMD includes generating image data and sending the image data to the HMD, the HMD having an image processing module for processing the image data to render image content on the screen of a viewing module of the HMD, the viewing module including an inner side having a view port into the screen that is configured for rendering the image content that defines the view of the virtual environment;

receiving captured image data of a plurality of illuminating elements integrated with an exterior housing of the viewing module of the HMD, and processing the captured image data to track the HMD.

19. A method, comprising:

rendering a view of a virtual environment to a head-mounted display;

receiving flex sensor data from a glove interface object, the flex sensor data identifying a flex of at least one finger portion of the glove interface object;

receiving pressure sensor data identifying a pressure applied to at least a portion of the glove interface object;

receiving contact sensor data from the glove interface object, the contact sensor data identifying contact between conductive pads respectively defined on different portions of the glove interface object, wherein the contact sensor data is generated in response to detected signals that are triggered by the contact between the conductive pads, wherein different signals correspond to contact between different sets of the conductive pads, wherein the contact sensor data includes data identifying contact between a thumb portion of the glove interface object on which a first one of the conductive pads is defined and a fingertip portion of at least one other finger portion of the glove interface object on which a second one of the conductive pads is defined, the first conductive pad having a voltage potential that is distinct from a voltage potential of the second conductive pad;

processing the flex sensor data and the pressure sensor data to determine a finger position pose of the glove interface object;

receiving captured image data of an interactive environment;

processing the captured image data to identify and track a location of the glove interface object in the interactive environment, wherein processing the captured image data includes identifying and tracking one or more lights defined on the glove interface object;

rendering in the view of the virtual environment a virtual hand, the virtual hand being rendered based on the identified finger position pose, wherein rendering the virtual hand is at a location in the virtual environment that is substantially defined by the location of the glove interface object in the interactive environment.

20. The method of claim 19, wherein the pressure sensor data quantifies an amount of force applied to the at least a portion of the glove interface object.

21. The method of claim 20, wherein the quantified amount of force defines a level of an action that is defined for the virtual environment.

22. The method of claim 19,
wherein the view of the virtual environment is defined from a perspective of a virtual character in the virtual environment that is associated to the head-mounted display;
wherein the virtual hand is a hand of the virtual character.

23. The method of claim 19, further comprising:
receiving inertial sensor data from the glove interface object;
processing the inertial sensor data to identify and track a location of the glove interface object in the interactive environment;
wherein rendering the virtual hand is at a location in the virtual environment that is substantially defined by the location and orientation of the glove interface object in the interactive environment.

24. The method of claim 19, further comprising:
detecting contact between the virtual hand and a virtual object in the virtual environment;
generating haptic feedback data based on the detected contact between the virtual hand and the virtual object;
sending the haptic feedback data to the glove interface object.

25. The method of claim 24, further comprising:
rendering, in the view of the virtual environment, visual feedback that is responsive to the detected contact between the virtual hand and the virtual object.

26. The method of claim 19,
wherein rendering the view of the virtual environment to the HMD includes generating image data and sending the image data to the HMD, the HMD having an image processing module for processing the image data to render image content on the screen of a viewing module of the HMD, the viewing module including an inner side having a view port into the screen that is configured for rendering the image content that defines the view of the virtual environment;
receiving captured image data of a plurality of illuminating elements integrated with an exterior housing of the viewing module of the HMD, and processing the captured image data to track the HMD.

27. The method of claim 26, wherein tracking the HMD is defined by tracking of one or more of an orientation or a location of the HMD.

28. The method of claim 19, wherein the one or more lights includes one or more LEDs.

* * * * *